US007366753B2

(12) United States Patent
Miyake

(10) Patent No.: US 7,366,753 B2
(45) Date of Patent: Apr. 29, 2008

(54) INFORMATION PROCESSING SYSTEM, APPARATUS AND METHOD FOR PROCESSING INFORMATION, AND PROGRAM

(75) Inventor: Takahiro Miyake, Tokyo (JP)

(73) Assignee: Sony Corporation, Tokyo (JP)

( * ) Notice: Subject to any disclaimer, the term of this patent is extended or adjusted under 35 U.S.C. 154(b) by 949 days.

(21) Appl. No.: 10/430,190

(22) Filed: May 7, 2003

(65) Prior Publication Data

US 2004/0024850 A1 Feb. 5, 2004

(30) Foreign Application Priority Data

May 23, 2002 (JP) ............................ P2002-149267
May 23, 2002 (JP) ............................ P2002-149268

(51) Int. Cl.
G06F 15/16 (2006.01)
(52) U.S. Cl. ...................... 709/203; 709/219; 715/738; 707/10; 705/26
(58) Field of Classification Search ................ 709/203, 709/217, 219; 715/733, 738; 707/10; 705/26
See application file for complete search history.

(56) References Cited

U.S. PATENT DOCUMENTS

| 5,640,253 | A | * | 6/1997 | Uchida et al. | |
|---|---|---|---|---|---|
| 5,832,464 | A | * | 11/1998 | Houvener et al. | ............ 705/45 |
| 6,055,563 | A | * | 4/2000 | Endo | |
| 7,000,195 | B2 | * | 2/2006 | Komuro | |
| 7,103,777 | B2 | * | 9/2006 | Sakaushima et al. | |
| 7,146,415 | B1 | * | 12/2006 | Doi | |
| 7,237,001 | B2 | * | 6/2007 | Yokono et al. | ............. 709/200 |
| 2002/0058519 | A1 | * | 5/2002 | Nagahara | ..................... 455/456 |
| 2002/0152123 | A1 | * | 10/2002 | Giordano et al. | ............. 705/14 |
| 2002/0176691 | A1 | * | 11/2002 | Muguruma et al. | |
| 2002/0186239 | A1 | * | 12/2002 | Komuro et al. | |
| 2003/0033205 | A1 | * | 2/2003 | Nowers et al. | |
| 2003/0041116 | A1 | * | 2/2003 | Jeyachandran et al. | |
| 2003/0165270 | A1 | * | 9/2003 | Endrikhovski et al. | |
| 2003/0202713 | A1 | * | 10/2003 | Sowa | ......................... 382/260 |
| 2003/0206668 | A1 | * | 11/2003 | Nakajima et al. | |

FOREIGN PATENT DOCUMENTS

| JP | 2001-45462 | 2/2001 |
|---|---|---|
| JP | 2001-101107 | 4/2001 |
| JP | 2001-333451 | 11/2001 |
| JP | 2002-57693 | 2/2002 |
| JP | 2002-85343 | 3/2002 |

* cited by examiner

*Primary Examiner*—Oanh Duong
(74) *Attorney, Agent, or Firm*—Oblon, Spivak, McClelland, Maier & Neustadt, P.C.

(57) ABSTRACT

In online shopping or the like via the Internet, a user transmits information indicating a credit card number or the like from a client computer of the user to a server of a mail-order dealer. Before such information is actually transmitted, the client computer displays an object selected depending on the importance level of the information which is going to be transmitted and moves the object from a location close to an information providing agent representative of an agent for the user to a location close to a shop agent representative of an agent for the mail-order dealer. Displaying the object in such a manner makes it possible for the user to recognize that the information is going to be transmitted and recognize the importance level of the information. After completion of moving the object, the client computer actually transmits the information to the server.

8 Claims, 40 Drawing Sheets

FIG. 11

| MERCHANDISE CATEGORY | MERCHANDISE ITEM CODE | MERCHANDISE | PRICE | NECESSARY ITEMS OF USER INFORMATION | ICON |
|---|---|---|---|---|---|
| SUPPLE-MENTS | ab001 | SUPPLEMENT A | 2000 | NAME, ADDRESS, AND CREDIT CARD NUMBER | ICON A |
| | ab002 | SUPPLEMENT B | 3500 | NAME, ADDRESS, CREDIT CARD NUMBER, AND TELEPHONE NUMBER | ICON B |
| | ab003 | SUPPLEMENT C | 15600 | NAME, ADDRESS, CREDIT CARD NUMBER, AND MAIL ADDRESS | ICON C |
| | ab004 | SUPPLEMENT D | 10000 | NAME, ADDRESS, AND CREDIT CARD NUMBER | ICON D |
| | ... | ... | ... | ... | ... |
| | ... | ... | ... | ... | ... |
| CD | cd101 | SELECTION OF ROCK AND ROLL | 32500 | NAME, ADDRESS, CREDIT CARD NUMBER, AND TELEPHONE NUMBER | ICON M |
| | cd110 | BEST OF JAPANESE SONGS | 15000 | NAME, ADDRESS, CREDIT CARD NUMBER, AND TELEPHONE NUMBER | ICON N |
| | ... | ... | ... | ... | ... |
| | ... | ... | ... | ... | ... |
| | ... | ... | ... | ... | ... |
| | ... | ... | ... | ... | ... |
| ... | ... | ... | ... | ... | ... |

FIG. 16

| USER INFORMATION | | IMPORTANCE LEVEL |
|---|---|---|
| NAME | DAISUKE SUZUKI | 1 |
| MAIL ADDRESS | suzuki@×××.co.jp | 1 |
| ADDRESS | 1-2-3×××-CHO, SHINJUKU-KU, TOKYO | 2 |
| TELEPHONE NUMBER | 03—××××—×××× | 4 |
| CREDIT CARD NUMBER | 0123456789 | 5 |
| PRICE | ¥123,456 | 5 |
| PURCHASE HISTORY | | 1 |
| OTHER INFORMATION | | 1 |

FIG. 17
| IMPORTANCE LEVEL | OBJECT |
|---|---|
| 1 | NONE |
| 2 | 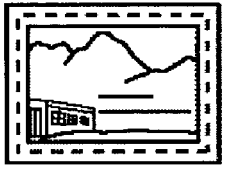 |
| 3 | 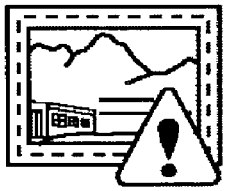 |
| 4 | 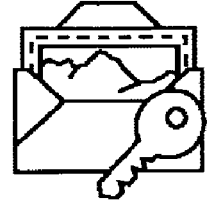 |
| 5 |  |

FIG. 18
| INFORMATION ITEM | OBJECT |
|---|---|
| NAME | 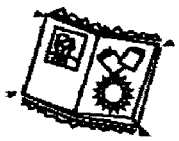 |
| MAIL ADDRESS |  |
| ADDRESS |  |
| TELEPHONE NUMBER |  |
| CREDIT CARD NUMBER |  |
| PRICE |  |
| PURCHASE HISTORY |  |
| OTHER INFORMATION |  |

FIG. 32

| PURCHASE DATA | PURCHASE TIME | MERCHANDISE NAME | MERCHANDISE CODE | PRICE |
|---|---|---|---|---|
| 2002.4.1 | 13:30 | SWEAT SUIT | tw123 | 12000 |
| 2002.4.3 | 15:24 | OLD HIT SONG CD SET | cd3453 | 29800 |
| 2002.4.8 | 17:16 | BOOK | bh34f5 | 1500 |
| 2002.4.15 | 21:18 | DIET FOOD | di987 | 15800 |
| 2002.4.22 | 10:22 | TRAINING MACHINE | trm953 | 24000 |
| 2002.4.22 | 11:13 | SPORTS SHOES | sps862 | 9800 |
| 2002.4.27 | 23:50 | CAP | ht777 | 10000 |

FIG. 37

| CATEGORY | ARTIST NAME | ALBUM/SINGLE CODE | ALBUM/SINGLE TITLE | PRICE | NECESSARY ITEMS OF USER INFORMATION | ICON |
|---|---|---|---|---|---|---|
| NEW ALBUMS/ SINGLES | ARTIST A | mu123 | TITLE A | 300 | NAME, CREDIT CARD NUMBER, AND MAIL ADDRESS | ICON A |
| | ARTIST B | sic456 | TITLE B | 250 | NAME, CREDIT CARD NUMBER, AND MAIL ADDRESS | ICON B |
| | ARTIST C | on789 | TITLE C | 350 | NAME, CREDIT CARD NUMBER, AND MAIL ADDRESS | ICON C |
| | ARTIST D | gaku1011 | TITLE D | 300 | NAME, CREDIT CARD NUMBER, MAIL ADDRESS, AND USER ID | ICON D |
| | ... | ... | ... | ... | ... | ... |
| | ... | ... | ... | ... | ... | ... |
| EUROPEAN MUSIC | ARTIST M | yo1213 | TITLE M | 300 | NAME, CREDIT CARD NUMBER, AND MAIL ADDRESS | ICON M |
| | ARTIST N | ugak1415 | TITLE N | 400 | NAME, CREDIT CARD NUMBER, AND MAIL ADDRESS | ICON N |
| | ... | ... | ... | ... | ... | ... |
| | ... | ... | ... | ... | ... | ... |
| | ... | ... | ... | ... | ... | ... |
| JAPANESE MUSIC | ... | ... | ... | ... | ... | ... |
| | ... | ... | ... | ... | ... | ... |
| | ... | ... | ... | ... | ... | ... |

INFORMATION PROCESSING SYSTEM, APPARATUS AND METHOD FOR PROCESSING INFORMATION, AND PROGRAM

BACKGROUND OF THE INVENTION

1. Field of the Invention

The present invention relates to an information processing system, an apparatus and method for processing information, and an information processing program, and more particularly, to an information processing system, an apparatus and method for processing information, and an information processing program, which allow a user to easily transmit/receive information in a secured manner.

2. Description of the Related Art

In many situations, personal information of a user is transmitted from a device connected to a network such as the Internet to another device on the network.

For example, when a user accesses a mail-order sales Web site from his/her general-purpose personal computer to purchase merchandise (in so-called online shopping), the user is required to transmit personal information such as a credit card number, a user name, and/or a telephone number from his/her personal computer to a particular computer. When a user responds to a questionnaire from a particular Web site, the user transmits a reply to the questionnaire from his/her personal computer to a particular computer. In another example, when a user makes a user registration of a purchased electric appliance via a network, the user transmits registration information from his/her personal computer to a particular computer.

In another example, when a reservation for a ticket or the like is made via a network or when stocks are sold/purchased via an electronic commerce system, users are required to transmit information necessary in transactions to specified computers via networks such as the Internet.

Also in many other situations, it is required to transmit personal information from a device connected to a network to another device on the network.

However, when personal information of a user is transmitted from a device connected to a network to another device on the network, the user cannot easily know whether or not the information has been transmitted or where the information has been transmitted to, and thus the user must be worried.

In particular, in a case in which information transmitted from a device such as a personal computer to another device on the network includes information which should be kept secret such as a credit card number, it is important for a user to know whether the information has been successfully transmitted to a correct destination. If the user cannot know whether or not the information has been transmitted to the correct destination, the user must be worried.

Another problem is that in some cases information is transmitted from a personal computer or the like to another device on the network without letting a user know how important information (which should be kept secret) is going to be transmitted.

A system is known in which a 3-dimensional virtual space is displayed on a display of a general-purpose computer, and a character allowed to be freely moved by a user is displayed in the virtual space. Such a system is used, for example, for online shops or various kinds of questionnaires.

When online shopping or a questionnaire is performed in such a 3-dimensional virtual space, a window for displaying a payment Web page or a questionnaire Web page is displayed on a display of a personal computer separately from the 3-dimensional virtual space so that information to be transmitted/received is input via the displayed separate window. However, employing such a window for displaying a payment Web page or a questionnaire Web page displayed separately from the 3-dimensional space makes it impossible to provide all service in a consistent manner only via the single 3-dimensional virtual space.

When personal information of a user is transmitted from a device connected to a network to another device on the network, if the user cancels the transmission of the information in the middle of transmission, a part of the information can have already be transmitted before the transmission is cancelled.

When information which should be kept secret, such as a credit card number or the like, is included in information transmitted from a personal computer or the like to another device on the network, if even a part of the information is transmitted, there is a possibility that the transmitted information is used for a bad purpose, and thus the user must be worried.

SUMMARY OF THE INVENTION

In view of the above, it is an object of the invention to provide a technique which allows a user to easily transmit and/or receive information in a more secured manner.

According to an aspect of the present invention, there is provided an information processing system comprising a first information processing apparatus connected to a network, and a second information processing apparatus for transmitting information to the first information processing apparatus, wherein the first information processing apparatus comprises reception means for receiving the information from the second information processing apparatus, and the second information processing apparatus comprises: storage means for storing images one of which is selected depending on an importance level of the information to be transmitted to the first information processing apparatus and is displayed reading means for, when the information is transmitted to the first information processing apparatus, reading from the storage means an image corresponding to the importance level of the information to be transmitted, display control means for controlling displaying the image read by the reading means, and transmission means for transmitting the information to the first information processing apparatus.

According to another aspect of the present invention, there is provided an information processing apparatus comprising storage means for storing images one of which is selected depending on an importance level of information to be transmitted to another information processing apparatus and is displayed, reading means for, when the information is transmitted to foregoing another information processing apparatus, reading from the storage means an image corresponding to the importance level of the information to be transmitted, display control means for controlling displaying the image read by the reading means, and transmission means for transmitting the information to foregoing another information processing apparatus.

According to still another aspect of the present invention, there is provided an information processing method comprising the steps of when information is transmitted to another information processing apparatus, reading an image corresponding to an importance level of the information to be transmitted, from a storage apparatus in which images corresponding to respective importance levels of information are stored, controlling displaying the image read in the reading step, and transmitting the information to foregoing another information processing apparatus.

According to still another aspect of the present invention, there is provided a program for controlling an information processing apparatus, the program comprising the steps of when information is transmitted to another information processing apparatus, reading an image corresponding to an importance level of the information to be transmitted, from a storage apparatus in which images corresponding to respective importance levels of information are stored, controlling displaying the image read in the reading step, and transmitting the information to foregoing another information processing apparatus.

According to still another aspect of the present invention, there is provided an information processing system comprising a first information processing apparatus connected to a network, and a second information processing apparatus for transmitting information to the first information processing apparatus, wherein the first information processing apparatus comprises reception means for receiving the information from the second information processing apparatus, and the second information processing apparatus comprises presenting means for presenting a message indicating that transmission of the information to the first information processing apparatus is in progress, and transmission means for transmitting the information to the first information processing apparatus after the presentation of the message by the presenting means is completed.

According to still another aspect of the present invention, there is provided an information processing apparatus comprising presenting means for presenting a message indicating that transmission of information to another information processing apparatus is in progress, and transmission means for transmitting the information to the foregoing another information processing apparatus after the presentation of the message by the presenting means is completed.

According to still another aspect of the present invention, there is provided an information processing method comprising the steps of presenting a message indicating that transmission of information to another information processing apparatus is in progress, and transmitting the information to the foregoing another information processing apparatus after the presentation of the message in the presentation step is completed.

According to still another aspect of the present invention, there is provided a program for controlling an information processing apparatus, the program comprising the steps of presenting a message indicating that transmission of information to another information processing apparatus is in progress, and transmitting the information to the foregoing another information processing apparatus after the presentation of the message in the presentation step is completed.

BRIEF DESCRIPTION OF THE DRAWINGS

FIG. 11 is a diagram showing an example of a merchandise database.

FIG. 16 is a diagram showing an example of a user information database;

FIG. 17 is a diagram showing an example of an object database;

FIG. 18 is a diagram showing another example of an object database;

FIG. 32 is a diagram showing an example of a purchase history database;

FIG. 37 is a diagram showing an example of a content database;

DESCRIPTION OF THE PREFERRED EMBODIMENTS

Figure 1:
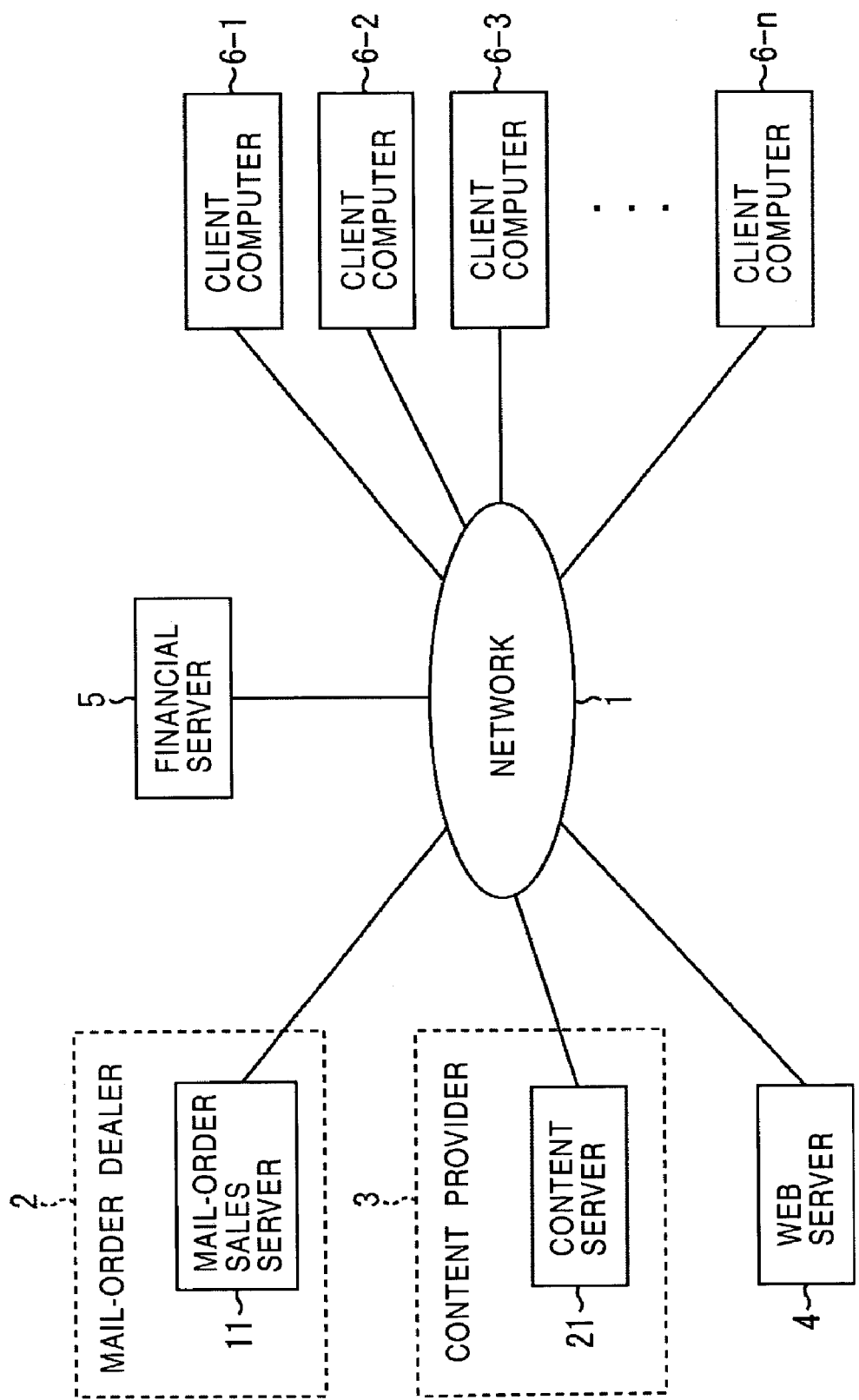
FIG. 1 is a diagram showing an embodiment of an information processing system according to the present invention.

FIG. 1 is a diagram showing an embodiment of an information processing system according to the present invention. In FIG. 1, a mail-order sales server 11 of a mail-order dealer 2, a content server 21 of a content provider 3, another Web server 4, a financial server 5, and client computers 6-1 to 6-n are connected to a network 1 such as the Internet (in the following description, when it is not needed to distinguish client computers 6-1 to 6-n from each other, a generic expression "client computer 6" is used).

The mail-order dealer 2 sells merchandise via an online shop. The mail-order sales server 11 of the mail-order dealer 2 is managed by the mail-order dealer 2. Using the mail-order sales server 11, the mail-order dealer 2 introduces and sells merchandise to client computers 6 via the network 1 and receives orders for merchandise from client computers 6 via the network 1.

The content provider 3 provides, as a business, contents such as music contents, video contents, and/or software to client computers 6 via the network 1, wherein payment may be needed for some contents while some contents may be free. The content server 21 introduces contents for sell to client computers 6 via the network 1 and provides contents in response to orders made by client computers 6.

The Web server 4 provides Web pages to users via the network 1. Furthermore, the Web server 4 acquires information such as replies to questionnaires or private information from client computers 6.

The financial server 5 is a server managed by a financial institution such as a bank or a credit card company. In response to a request received via the network 1 from another server, the financial server 5 performs payment for a price (transfer of money from/into a specified account).

Figure 6:
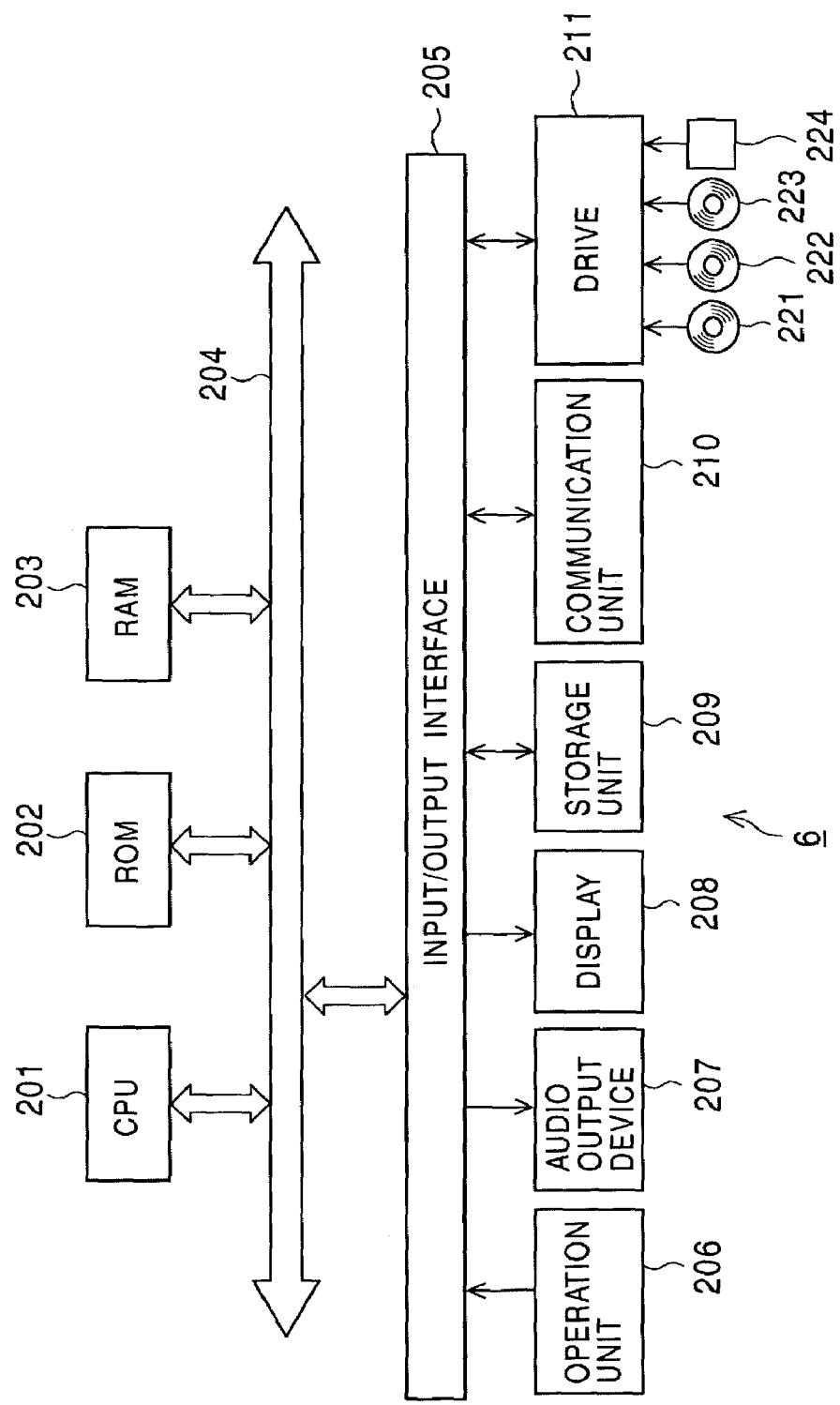
FIG. 6 is a block diagram showing an example of a construction of a client computer.

Each client computer 6 is managed and operated by its user. For example, the client computer 6 receives information about merchandise (data indicating prices and/or functions, and/or images representing appearances) dealt with from the mail-order sales server 11 and displays the received information on the display 208 (FIG. 6). If the user selects a piece of merchandise from those displayed on the display 208, the client computer 6 transmits order information to the mail-order sales server 11 to make an order for the merchandise specified by the user with the mail-order dealer 2. Before the order information is transmitted in the above process, an image corresponding to the importance level of the information to be transmitted from the client computer 6 to the mail-order sales server 11 is displayed on the display 208 of the client computer 6, as will be described in further detail later.

The client computer 6 also receives information about contents available from the content server 21 and displays the received information on the display 208 (FIG. 6) (the information may include icons of contents and data indicating prices and/or titles). If a content to be downloaded is selected by a user from contents displayed on the display 208, the client computer 6 transmits order information to the content server 21 to make an order for the content specified by the user with the content provider 3. Before the transmission of the order information, an image corresponding to the importance level of the information to be transmitted from the client computer 6 to the content server 21 is displayed on the display 208 of the client computer 6, as will be described in further detail later.

The client computer 6 also receives a Web page or the like provided by the Web server 4 and displays the receives Web page on the display 208. When the client computer 6 transmits information such as private information of a user to the Web server 4, the client computer 6 displays, on the display 208 thereof, an image corresponding to the importance level of the information to be transmitted.

Figure 2:
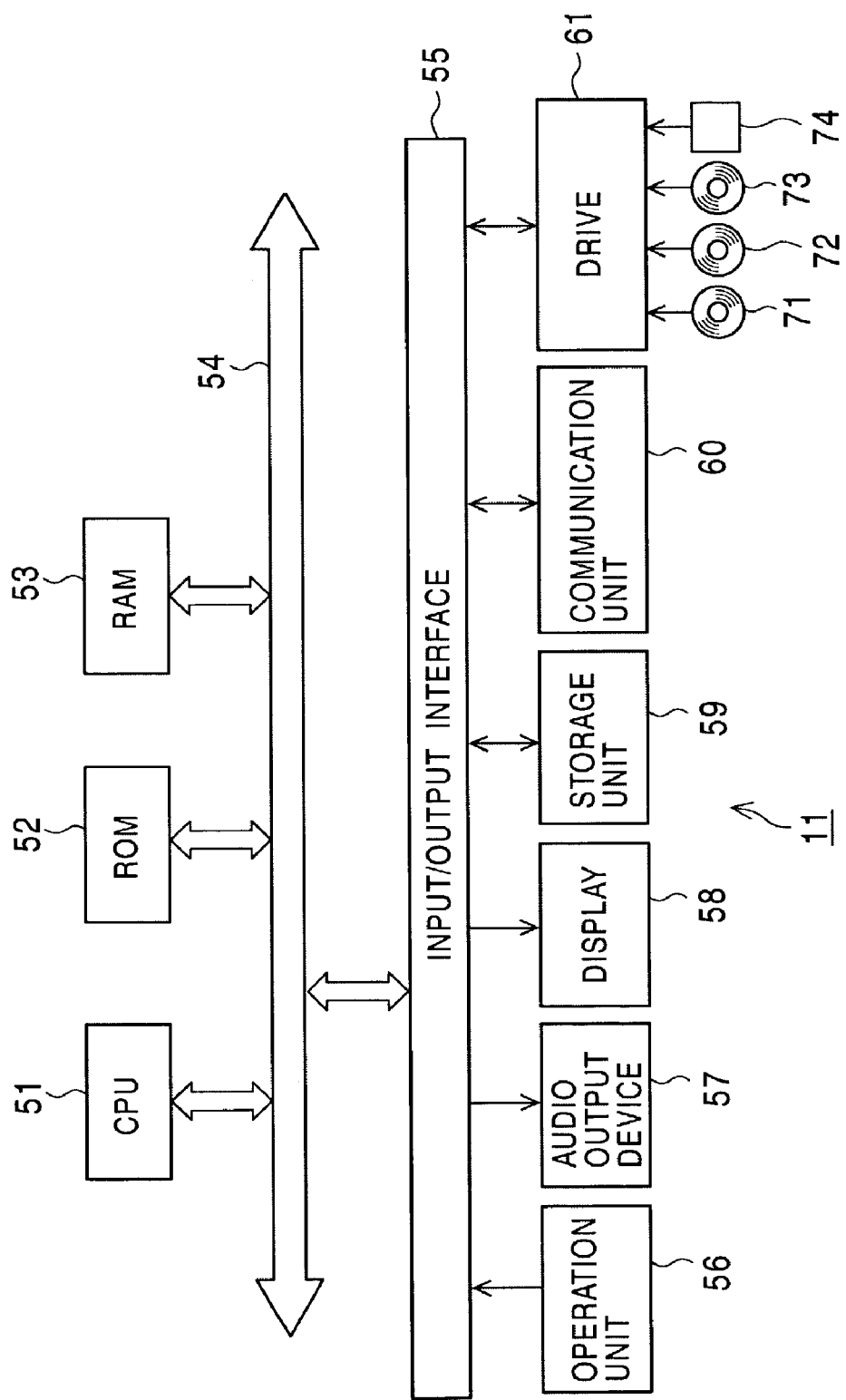
FIG. 2 is a block diagram showing an example of a construction of a mail-order sales server.

FIG. 2 shows an example of a construction of the mail-order sales server 11. In FIG. 2, a CPU 51 performs various processes, including processes described later with reference to flow charts shown in FIG. 10, FIG. 15, and FIG. 29, in accordance with a program stored in ROM 52 or a program loaded into a RAM 53 from a storage unit 59. In the RAM 53, data used by the CPU 51 in execution of various processes is also stored as required, The CPU 51, the ROM 52, and the RAM 53 are connected to each other via a bus 54. An input/output interface 55 is also connected to the bus 54.

An operation unit 56 including a keyboard and/or mouse, an audio output unit 57 including a speaker, a display 58 including a cathode ray tube (CRT) or a liquid crystal display (LCD), a storage unit 59 including a hard disk or the like, and a communication unit 60 including a modem or a terminal adapter are connected to the input/output interface 55. The communication unit 60 performs communication via the network 1 including the Internet.

If required, a drive 61 may be connected to the input/output interface 55. An magnetic disk 71, an optical disk 72, a magnetooptical disk 73, or a semiconductor memory 74 is mounted on the drive 61, as required, and computer program is read from the disk mounted on the drive 61 and installed into the storage unit 59, as required.

Figure 3:
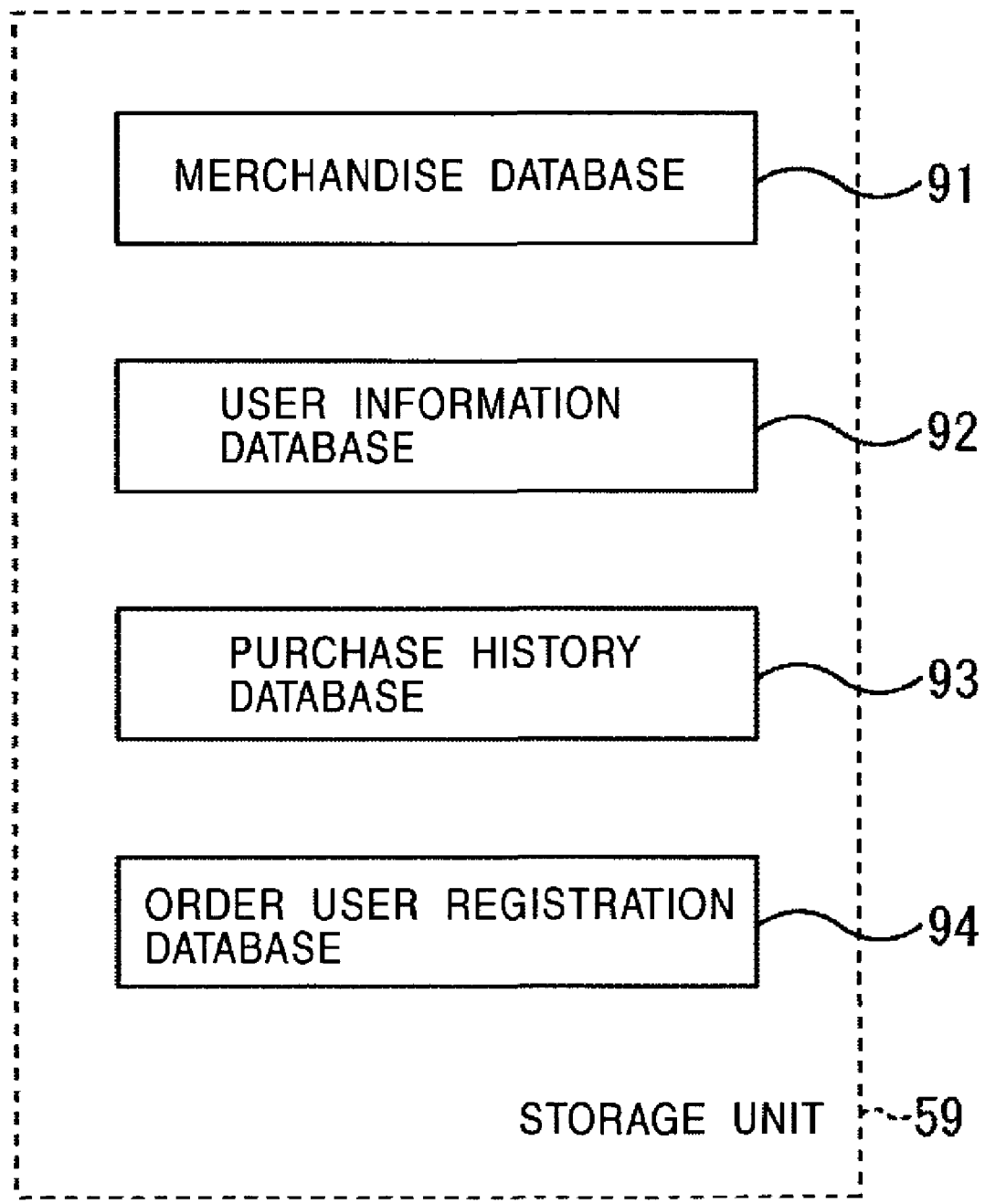
FIG. 3 is a block diagram showing examples of databases stored in the storage unit of the mail-order sales server.

FIG. 3 shows examples of databases stored in the storage unit 59 of the mail-order sales server 11. Herein, a merchandise database 91 is a database for managing information associated with merchandise dealt with by the mail-order dealer 2 in mail-order sales via the network 1, wherein the information may include prices, functions, images of appearances, and data indicating whether merchandise is in stock, and the information is managed separately for each merchandise.

A user information database 92 is a database for managing personal information of users, wherein the personal information is received from client computers 6 when orders for merchandise are made by users and wherein the personal information is managed separately for each merchandise ordered. A purchase history database 93 is a database for managing information associated with merchandise purchase history, wherein the information is collected by the mail-order sales server 11 from client computers 6 via the network 1. An orderer registration database 94 is a database for registering users who make mail-orders. Note that information (and/or programs) other than the databases shown in FIG. 3 is also stored in the storage unit 59.

Figure 4:
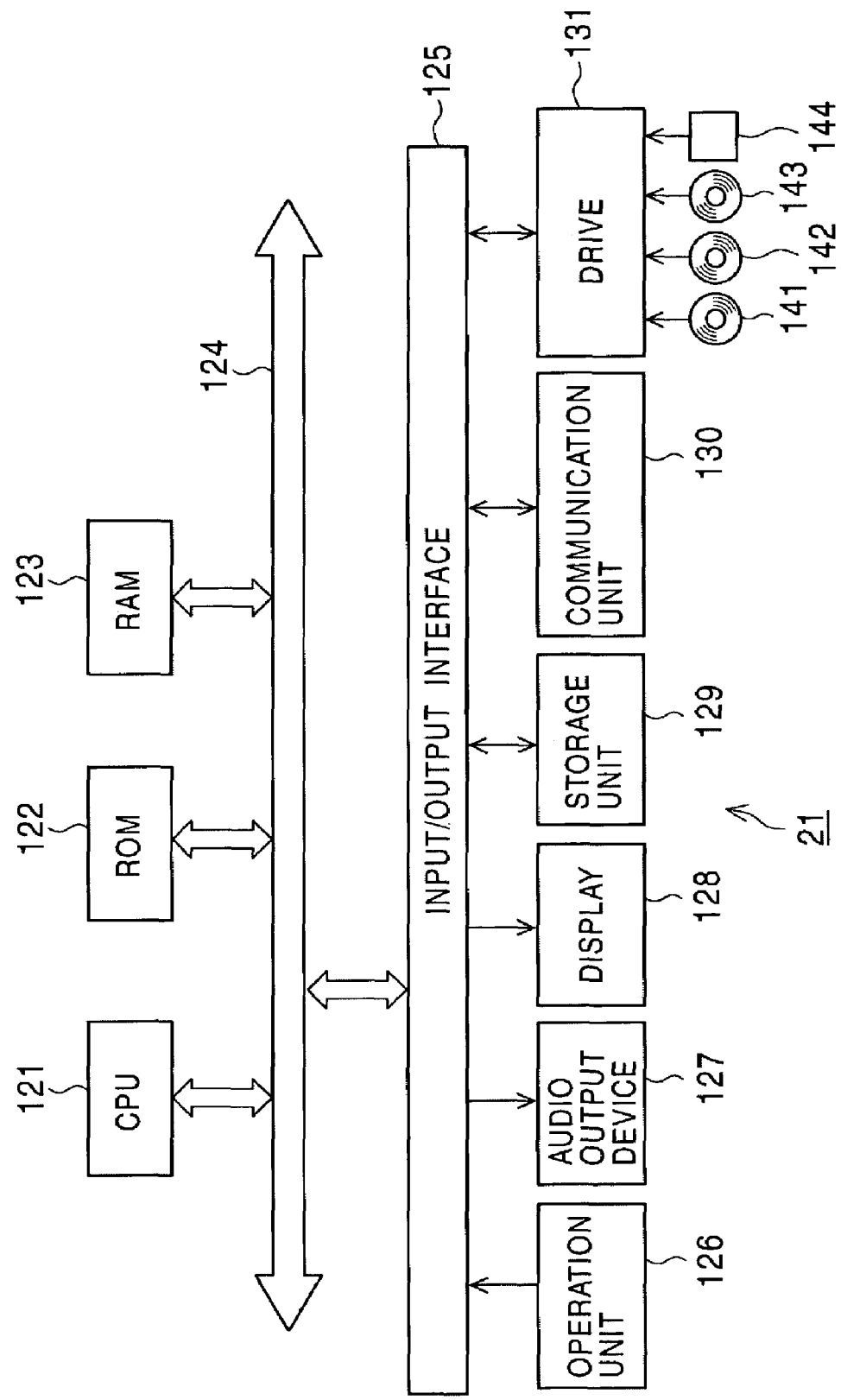
FIG. 4 is a block diagram showing an example of a construction of a content server.

FIG. 4 shows an example of a construction of the content server 21. In FIG. 4, a CPU 121 performs various processes, including processes described later with reference to a flow chart shown in FIG. 40, in accordance with a program stored in ROM 122 or a program loaded into a RAM 123 from a storage unit 129. In the RAM 123, data used by the CPU 121 in execution of various processes is also stored as required.

The CPU 121, the ROM 122, and the RAM 123 are connected to each other via a bus 124. An input/output interface 125 is also connected to the bus 124.

An operation unit 126 including a keyboard and/or mouse, an audio output unit 127 including a speaker, a display 128 including a CRT or a LCD, a storage unit 129 including a hard disk or the like, and a communication unit 130 including a modem or a terminal adapter are connected to the input/output interface 125. The communication unit 130 performs communication via the network 1 including the Internet.

If required, a drive 131 may be connected to the input/output interface 125. An magnetic disk 141, an optical disk 142, a magnetooptical disk 143, or a semiconductor memory 144 is mounted on the drive 131, as required, and computer program is read from the disk mounted on the drive 131 and installed into the storage unit 129, as required.

Figure 5:
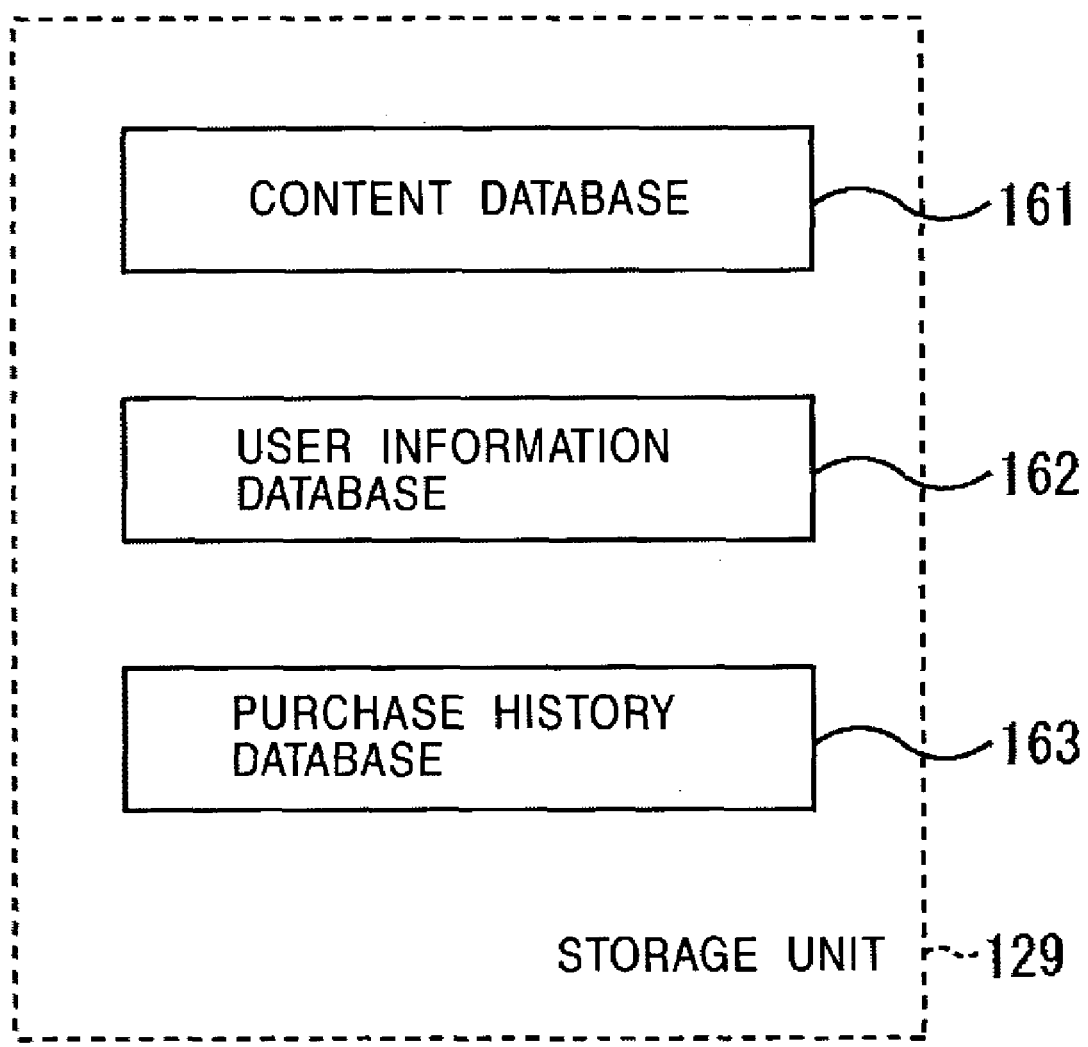
FIG. 5 is a block diagram showing examples of databases stored in the storage unit of the content server.

In the content server 21, databases such as those shown in FIG. 5 are stored in the storage unit 129. In FIG. 5, a content database 161 is a database storing information in terms of prices, functions, and other items of contents that the content server 21 provides via the network 1, wherein the information is managed on a content-by-content basis.

A user information database 162 is a database for managing personal information of users who have issued requests for contents, wherein the personal information is received from client computers 6 when requests for contents are received, and wherein the personal information is managed separately for each content. A purchase history database 163 is a database for managing information associated with merchandise purchase history, wherein the information is collected by the content server 21 from client computers 6 via the network 1. Note that information (and/or programs) other than the databases shown in FIG. 5 is also stored in the storage unit 129.

FIG. 6 shows an example of a construction of a client computer 6. In FIG. 6, a CPU 201 performs various processes, including processes described later with reference to flow charts shown in FIG. 9, FIG. 13, FIG. 14, FIG. 30, FIG. 31, FIG. 33, FIG. 36, FIG. 38 and FIG. 39, in accordance with a program stored in ROM 202 or a program loaded into a RAM 203 from a storage unit 209. In the RAM 203, data used by the CPU 201 in execution of various processes is also stored as required.

The CPU 201, the ROM 202, and the RAM 203 are connected to each other via a bus 204. An input/output interface 205 is also connected to the bus 204.

An operation unit 206 including a keyboard and/or mouse, an audio output unit 207 including a speaker, a display 208 including a CRT or a LCD, a storage unit 209 including a hard disk or the like, and a communication unit 210 including a modem or a terminal adapter are connected to the input/output interface 205. The communication unit 210 performs communication via the network 1 including the Internet.

If required, a drive 211 may be connected to the input/output interface 205. An magnetic disk 221, an optical disk 222, a magnetooptical disk 223, or a semiconductor memory 224 is mounted on the drive 211, as required, and computer program is read from the disk mounted on the drive 211 and installed into the storage unit 209, as required.

Figure 7:
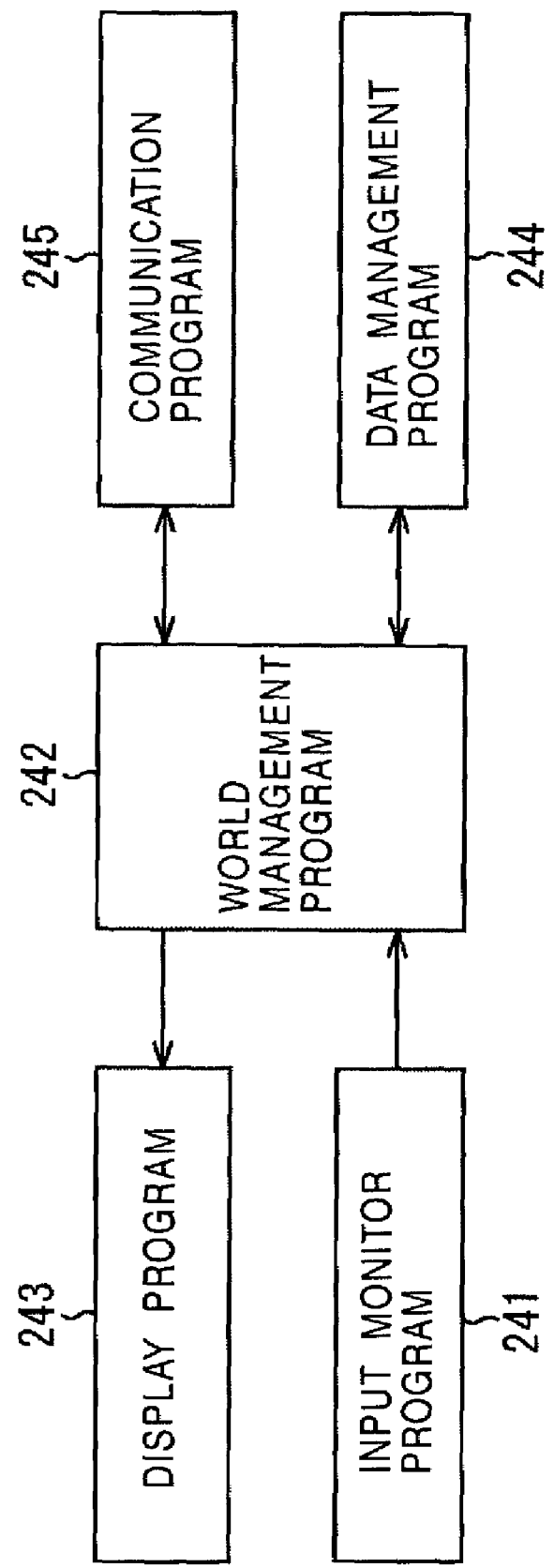
FIG. 7 is a diagram showing a program for controlling a client computer.

FIG. 7 is a block diagram showing an example of a set of programs executed by the CPU 201 of the client computer 6. In FIG. 7, an input monitor program 241 monitors the operation unit 206 to detect an operation performed on the operation unit 206. If an operation performed on the operation unit 206 by a user is detected, the input monitor program 241 supplies operation information corresponding to the operation to a world management program 242. In mail-order selling and content transmission, the world management program 242 commands the input monitor program 241, the display program 243, the data management program 244, and the communication program 245 to perform necessary processes. For example, in accordance with operation information supplied from the input monitor program 241, communication information supplied from the communication program 245, or information supplied from the data management program 244, the world management program 242 determines an image to be displayed on the display 208 and supplies the resultant image to the display program 243.

The display program 243 displays the image received from the world management program 242 on the display 208. The data management program 244 manages the operation of recording and updating private information of users (in terms of names, addresses, telephone numbers, e-mail addresses, and credit card numbers). The data management program 244 also manages the operation of recording and updating objects (which are images, such as an object 472 shown in FIG. 20, which correspond to respective importance levels of information and which are used in such a manner that when the client computer 6 transmits information to the mail-order sales server 11, the content server 21, or the Web server 4, an image corresponding to the importance level of the information to be transmitted is displayed on the display 208 of the client computer 6). The data management program 244 also manages the operation of recording and updating merchandise purchase history and contents that users purchased in the past. The communication program 245 performs a communication process in which information is transmitted and/or received via the communication unit 210.

Figure 8:
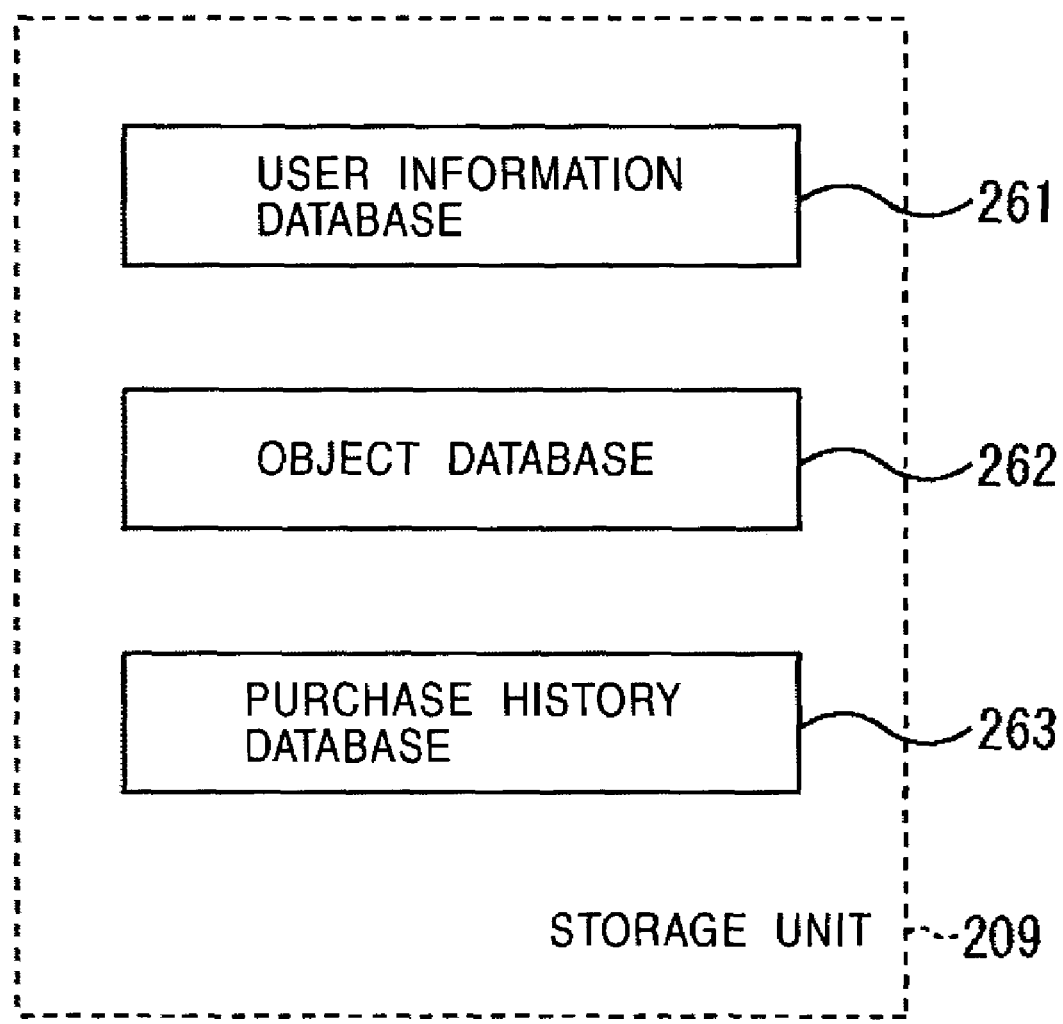
FIG. 8 is a block diagram showing examples of databases stored in the storage unit of a client computer.

FIG. 8 shows examples of databases stored in the storage unit 209 of the client computer 6. The user information database 261 is a database for managing user's private information transmitted to the mail-order sales server 11, the content server 21, or the Web server 4. In the user information database 261, user's private information is stored such that an importance level is defined for each item of private information of each user (the details of user's private information will be described later with reference to FIG. 16).

The object database 262 is a database for managing data of images which correspond to respective importance levels of information and which are used in such a manner that when information is transmitted from the client computer 6 to the mail-order sales server 11, the content server 21, or the Web server 4, an image corresponding to the importance level of the information to be transmitted is displayed on the display 208 of the client computer 6. In the present embodiment, when information is transmitted, an image indicating that information is going to be transmitted is displayed on the display 208, wherein the image displayed on the display 208 is varied depending on the importance level of the information to be transmitted. In the object database 262, such images are stored.

The purchase history database 263 is a database for managing information about history of purchasing of merchandise (contents) performed by the client computer 6 from the mail-order sales server 11 or the content server 21 via the network 1. Note that information (and/or programs) other than the databases shown in FIG. 8 is also stored in the storage unit 59.

In the present embodiment, when a user makes an order for merchandise with the mail-order dealer 2, the client computer 6 first acquires, from the mail-order sales server 11, data associated with one or more pieces of merchandise dealt with by the mail-order dealer 2 and displays the acquired data on the display 208. If the user selects one piece of merchandise from those displayed on the display 208, the client computer 6 transmits information associated with the order to the mail-order sales server 11 to make the order with the mail-order dealer 2.

When the client computer 6 displays, on the display 208, the data associated with merchandise acquired from the mail-order sales server 11, an image of a shop is displayed in a 3-dimensional virtual space (hereinafter, such a shop will be referred to as a virtual shop) and the pieces of merchandise are displayed in the virtual shop.

Figure 9:
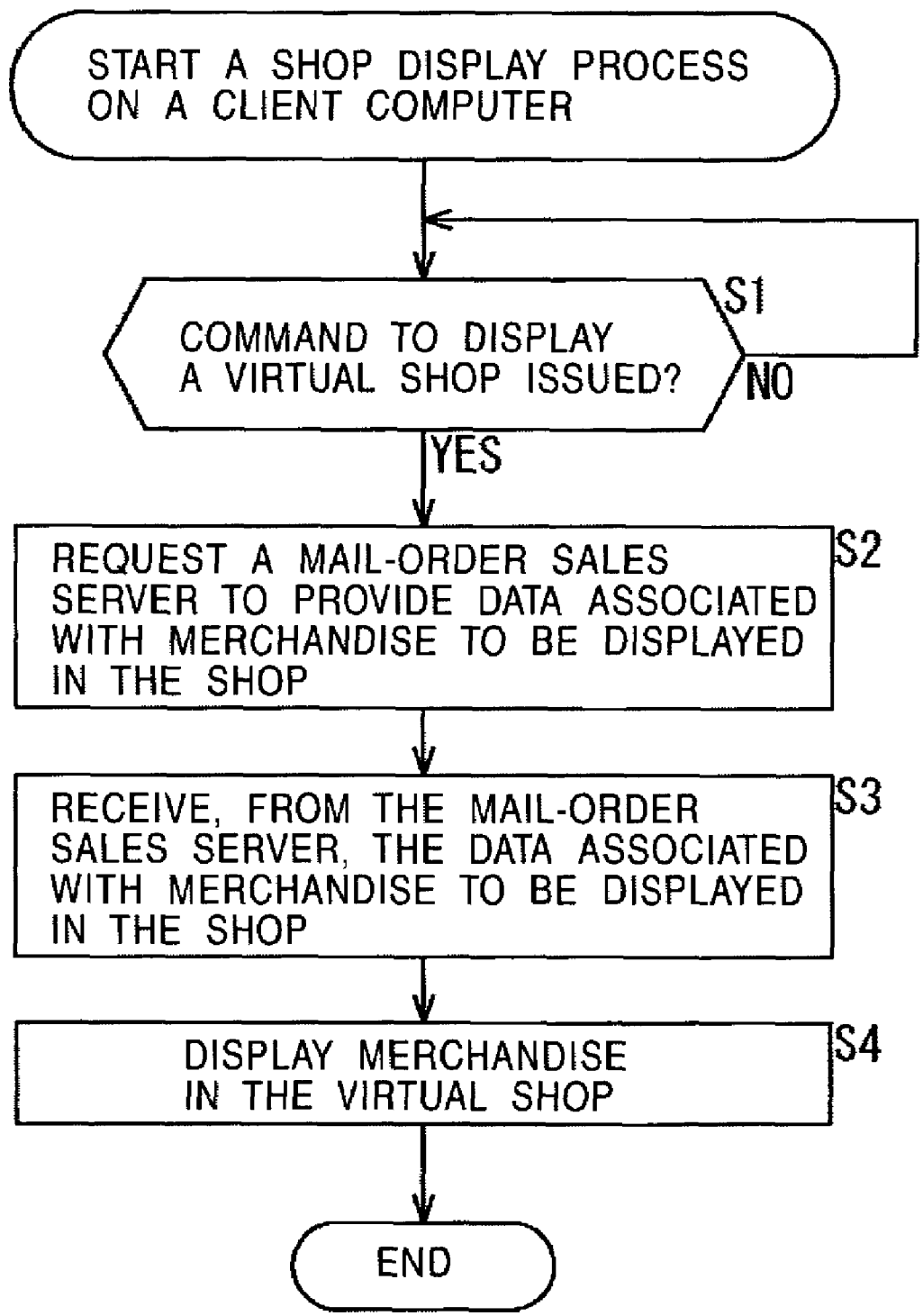
FIG. 9 is a flow chart showing a shop displaying process performed by a client computer.
Figure 10:
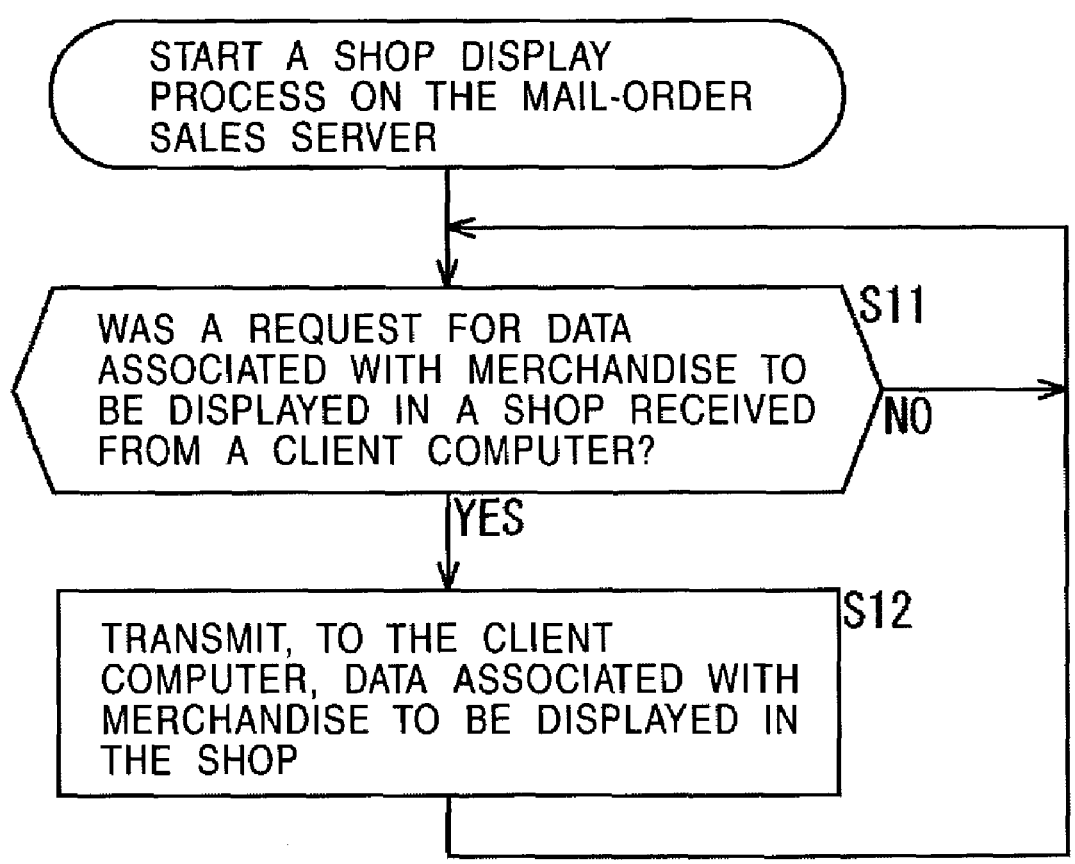
FIG. 10 is a flow chart showing a shop displaying process performed by the mail-order sales server.

Now, referring to flow charts shown in FIGS. 9 and 10, a shop displaying process is described, in which a virtual shop is displayed on the display 208 of the client computer 6 and merchandise is displayed in the virtual shop. The flow chart shown in FIG. 9 represents a process performed by the client computer 6, and the flow chart shown in FIG. 10 represent a process performed by the mail-order sales server 11.

In the following description, the process of the client computer 6 is performed by the CPU 201 by executing programs. The processes of the mail-order sales server 11 is performed by the CPU 51 by executing various programs. Communication between the client computer 6 and the mail-order sales server 11 is performed via the network 1.

The input monitor program 241 monitors the operation unit 206 to detect an operation performed on the operation unit 206. If an operation performed on the operation unit 206 is detected, the input monitor program 241 supplies operation information indicating the performed operation to the world management program 242. In step S1 in FIG. 9, on the basis of operation information provided by the input monitor program 241, the world management program 242 determines whether a command to display a virtual shop is input via the operation unit 206. If inputting, via the operation unit 206, of the command to display a virtual shop is not detected, step S1 is repeated.

That is, the world management program 242 performs step S1 repeatedly until the command to display a virtual shop is input via the operation unit 206. If the world management program 242 determines that the command to display a virtual shop is input via the operation unit 206, the process proceeds to step S2.

In step S2, the world management program 242 commands the communication program 245 to request the mail-order sales server 11 to supply data associated with merchandise to be displayed in the virtual shop. The communication program 245 requests the mail-order sales server 11 to supply the data associated with merchandise to be displayed in the virtual shop. The request is transmitted from the communication unit 210 of the client computer 6 to the mail-order sales server 11 via the network 1.

The CPU 51 of the mail-order sales server 11 waits in step S11 in FIG. 10 until the request for the data of merchandise to be displayed in the virtual shop is received from the client computer 6. If the request from the client computer 6 is received via the communication unit 60, the process proceeds to step S12.

In step S12, the CPU 51 of the mail-order sales server 11 reads the data of merchandise to be displayed in the virtual shop from the merchandise database 91 and transmits it from the communication unit 60 to the client computer 6 via the network 1. FIG. 11 shows an example of the merchandise database 91. In a row at the top in FIG. 11, field names, "merchandise category", "merchandise code", "merchandise name", "price", "items of necessary user information", and "icon", are described from left to right.

Herein, the "merchandise category" refers to a category defined for merchandise dealt with by the type of merchandise (for example, supplements, CDs, shoes, and books). The "merchandise code" refers to a code preassigned to each merchandise to identify the merchandise. The "merchandise name" refers to a name of merchandise. The "items of necessary user information" refers to items of user information which is needed to be acquired from a user when merchandise is sold to the user. The "icon" refers to an icon of merchandise displayed in the virtual shop. Each icon may be displayed in the form of a 3-dimensional image representing the outward appearance of corresponding merchandise.

In the present embodiment, the virtual shop displayed may be changed depending on the type of merchandise dealt with (for example, virtual shops may include a bookstore, a shoe store, a hat store, supplement store, and a CD shop). As shown in FIG. 11, data associated with merchandise to be displayed is managed for each virtual shop. That is, in the field of "merchandise category" in the leftmost column in FIG. 11, categories of merchandise, such as "supplements", "CDs", etc., are described and sorted starting from the top.

For example, if a command to display a virtual shop dealing with supplements is issued in step S1 in FIG. 9, then, in step S2, the client computer 6 requests the mail-order sales server 11 to supply data associated with supplements. If the mail-order sales server 11 receives the request from the client computer 6, then, in step S12, the mail-order sales server 11 transmits data indicating merchandise codes, merchandise names, prices, and icons of merchandise categorized as supplements in FIG. 11 to the client computer 6.

After completion of step S12, the process return to step S11, and step S11 and steps following that are repeated.

In step S3 in FIG. 9, the communication unit 210 of the client computer 6 receives the data associated with the merchandise transmitted in step S12 by the mail-order sales server 11. The communication program 245 transfers the received information to the world management program 242. In step S4, the world management program 242 requests the display program 243 to display a virtual shop and also display an images (icons) of merchandise at particular locations in the virtual shop, in accordance with the merchandise data received in step S3.

In accordance with the request from the world management program, the display program 243 displays an image of virtual shop on the display 208 and further displays images (icons) of merchandise at particular locations in the virtual shop.

Figure 12:
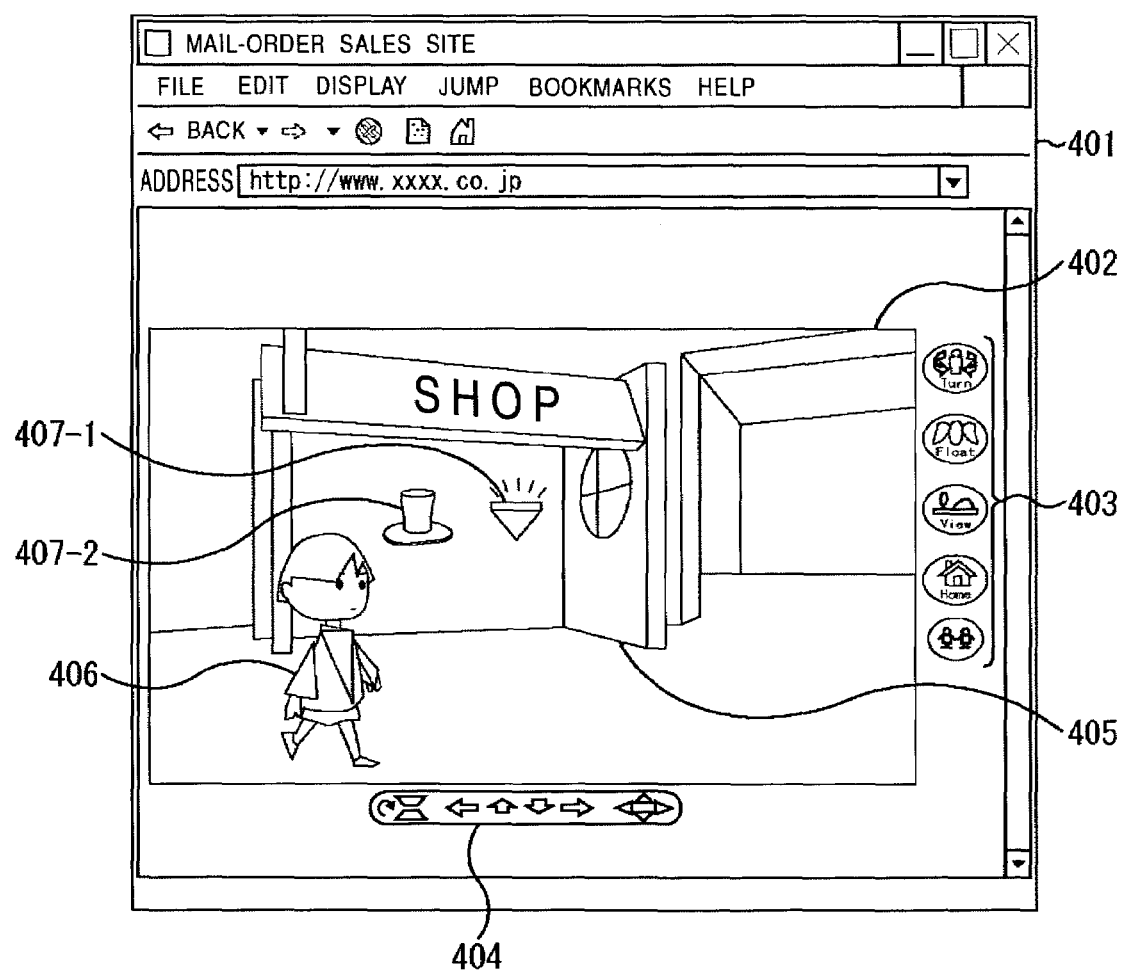
FIG. 12 is a diagram showing an example of an image displayed on a display of a client computer.

FIG. 12 shows an example of an image displayed, in step S4, on the display 208 of the client computer 6. In the specific example shown in FIG. 12, a 3-dimensional virtual space is displayed in a virtual space display area 402 of a browser 401, and a virtual shop 405 is displayed in the virtual space display area 402. If one of operation buttons 403 is clicked with, for example, a mouse (operation unit 206), a process preassigned to the clicked operation button 403 is performed. On the other hand, one of arrow buttons 404 is clicked with the mouse or the like (operation unit 206), the angle of the virtual space display area 402 is changed in accordance with the direction of the clicked arrow button.

In the virtual shop 405, two merchandise icons 407-1 and 407-2 are displayed (hereinafter, when it is not needed to distinguish merchandise icons 407-1 and 407-2 from each other, a generic expression "merchandise icon 407" will be used). The merchandise icons 407 may be displayed in the form of 3-dimensional images. The merchandise icons 407 are included in the merchandise data received in step S3. A shop agent 406, representing a shopkeeper of the virtual shop 405 of the merchandise, is also displayed in the virtual space display area 402. The shop agent 406 may also be displayed in the form of a 3-dimensional image.

As described above, the virtual shop 405 is displayed on the display 208 of the client computer 6, and merchandise icons 407 corresponding to merchandise are displayed at particular locations in the virtual shop 405. A user can select merchandise to purchase by double-clicking a corresponding merchandise icon with the mouse or the like (operation unit 206).

Figure 13:
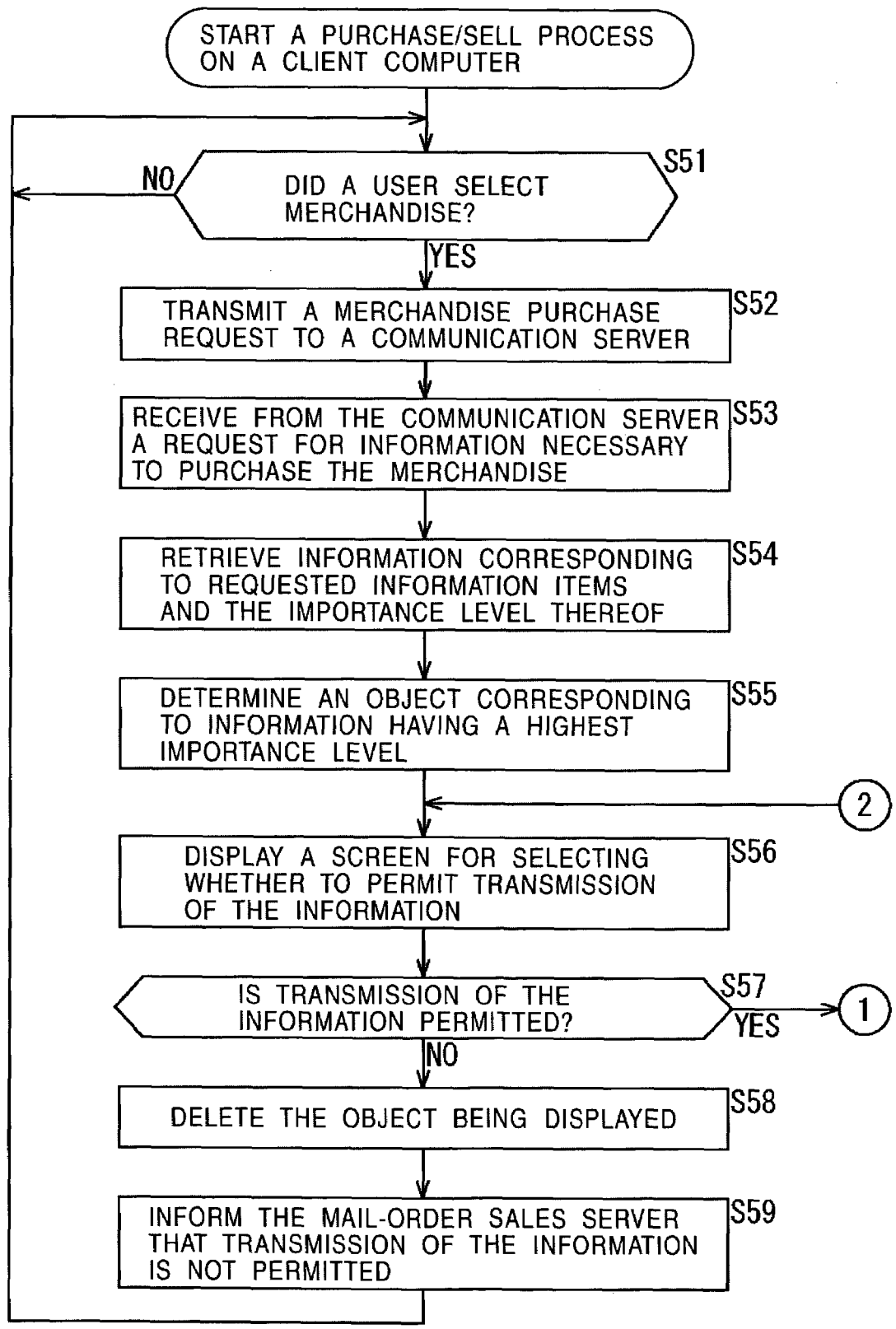
FIG. 13 is a flow chart showing a part of a purchase/sell process performed by a client computer.
Figure 14:
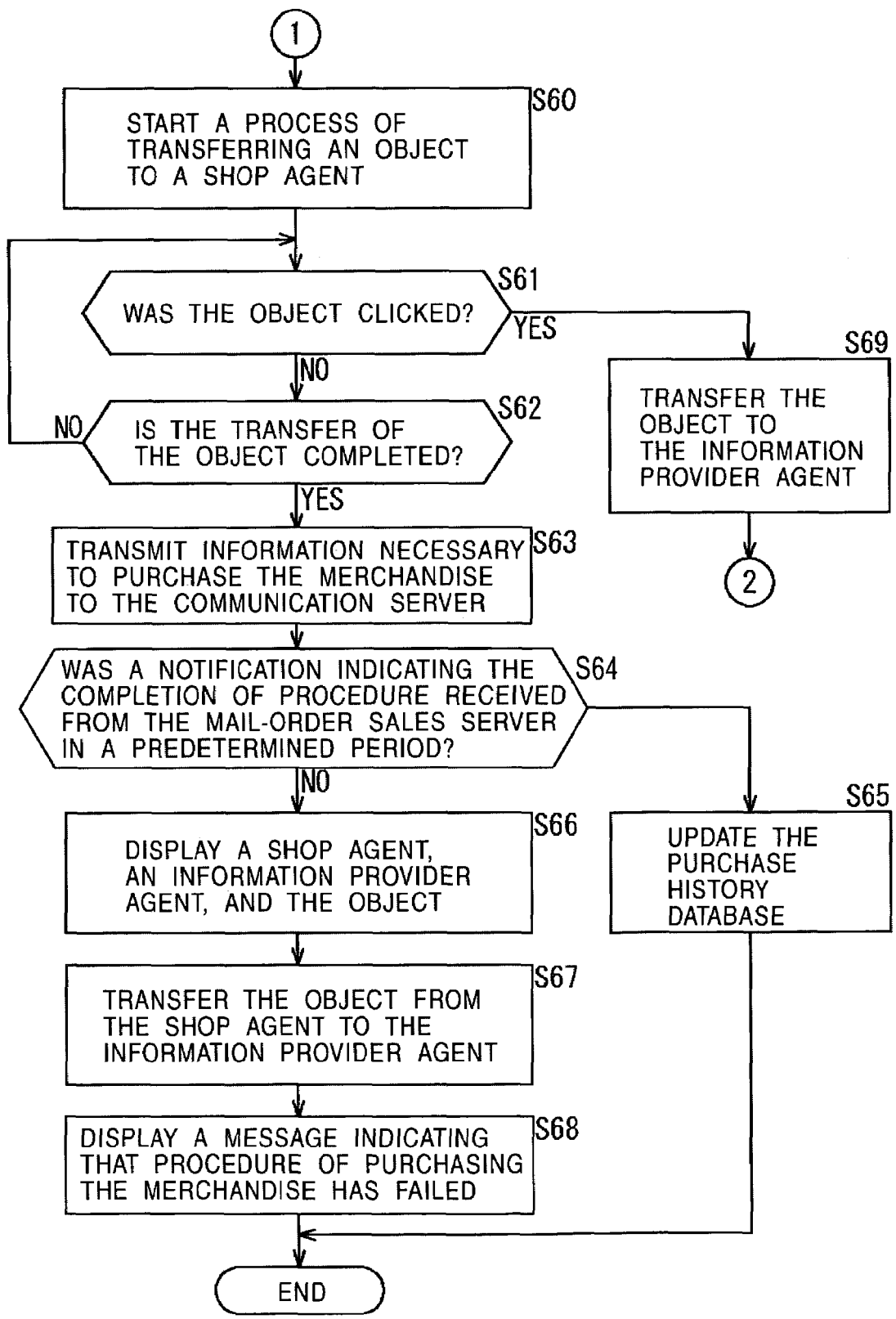
FIG. 14 is a flow chart showing another part of the purchase/sell process performed by the client computer.
Figure 15:
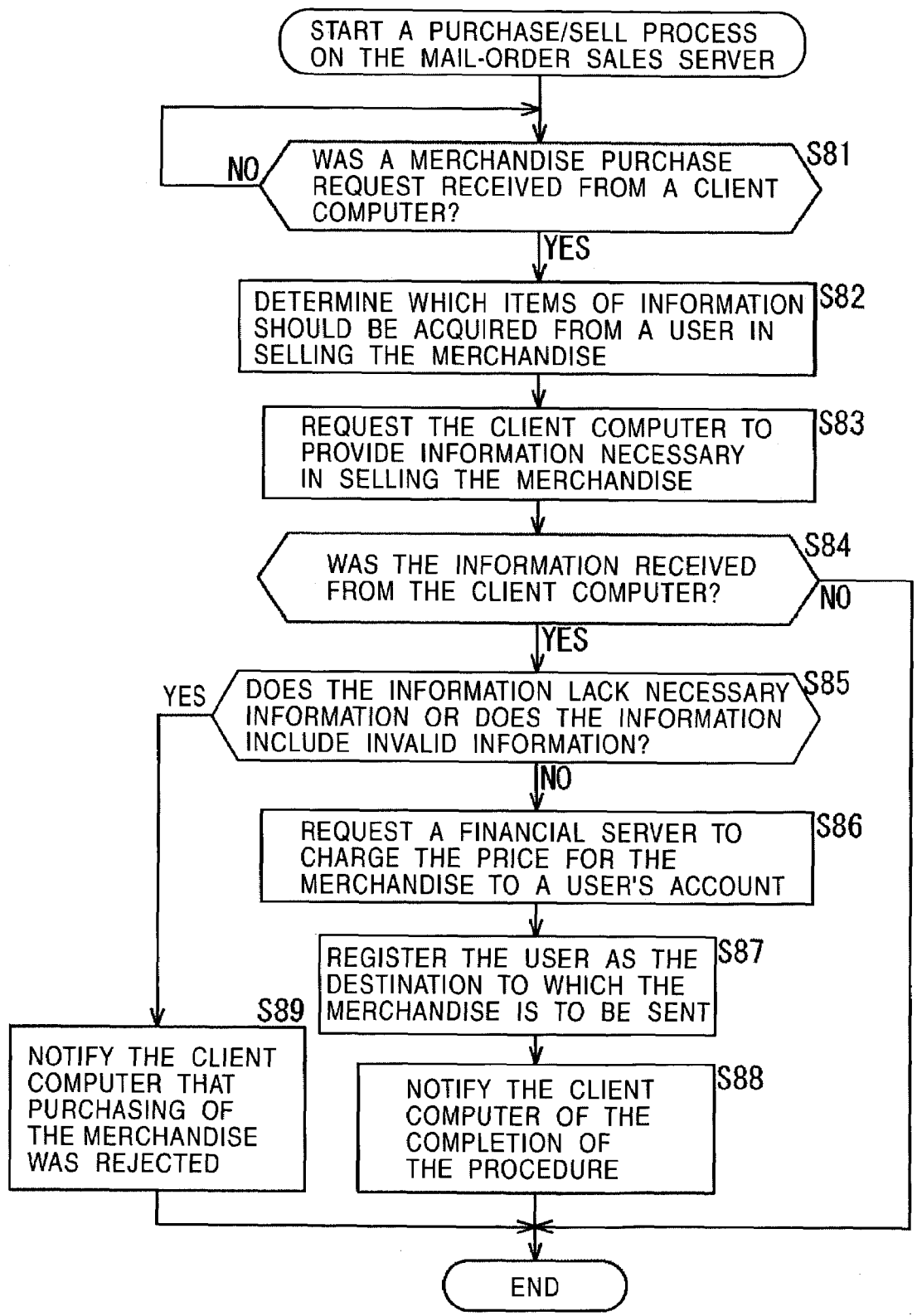
FIG. 15 is a flow chart showing a purchase/sell process performed by the mail-order sales server.

Referring now to flow charts shown in FIGS. 13 to 15, a merchandise purchase/sell process is described, in which a user purchases merchandise by selecting one of the merchandise icons 407 displayed in the virtual shop 405. The flow charts shown in FIG. 13 and FIG. 14 represent a process performed by the client computer 6, and the flow chart shown in FIG. 15 represent a process performed by the mail-order sales server 11. In the following description, the process of the client computer 6 is performed by the CPU 201 by executing various programs. The process of the mail-order sales server 11 is performed by the CPU 51 by executing various programs.

The input monitor program 241 monitors the operation unit 206 to detect an operation performed on the operation unit 206. If an operation performed on the operation unit 206 is detected, the input monitor program 241 supplies operation information indicating the performed operation to the world management program 242. In step S51 in FIG. 13, on the basis of operation information provided by the input monitor program 241, the world management program 242 determines whether an operation of selecting a merchandise icon 407 is performed on operation unit 206. If the operation of selecting a merchandise icon 407 performed on operation unit 206 is not detected, step S51 is repeated.

Step S51 is performed repeatedly until an operation of selecting a merchandise icon 407 is performed on the operation unit 206. If the world management program 242 determines that the operation of selecting a merchandise icon 407 is performed on operation unit 206, the process proceeds to step S52.

In step S52, the world management program 242 commands the communication program 245 to request the mail-order sales server 11 to sell merchandise corresponding to the selected merchandise icon 407. In response, the communication program 245 requests the mail-order sales server 11 to sell the merchandise corresponding to the selected merchandise icon 407. The request is transmitted from the communication unit 210 of the client computer 6 to the mail-order sales server 11 via the network 1. The request includes a merchandise code of the merchandise corresponding to the selected merchandise icon 407. When the mail-order sales server 11 receives the request, the mail-order sales server 11 can identify which merchandise is requested to sell, on the basis of the merchandise code.

The CPU 51 of the mail-order sales server 11 waits in step S81 in FIG. 15 until a merchandise purchase request is received from the client computer 6. If a merchandise purchase request from the client computer 6 is received via the communication unit 60, the process proceeds to step S82.

In step S82, the CPU 51 of the mail-order sales server 11 reads a merchandise code included in the received purchase request. The CPU 51 then searches the merchandise database 91 shown in FIG. 11 to identify merchandise code identical to the merchandise code included in the received purchase request. Furthermore, from the merchandise database 91 shown in FIG. 11, the CPU 51 reads items of information (such as a name, an address, and/or a credit card number) which should be acquired from the user in selling the merchandise corresponding to the identified merchandise code. Thereafter, the process proceeds to step S83.

In step S83, via the communication unit 60, the CPU 51 transmits to the client computer 6 a request for information of the items (such as the name, the address, and/or the credit card number) read in step S82.

In step S53 in FIG. 13, the communication program 245 of the client computer 6 receives the request for the information (in terms of, for example, the name, the address, and/or the credit card number) transmitted in step S83 from the mail-order sales server 11. In step S54, the world management program 242 searches the user information database 261 for the requested information and detects the importance level of the requested information. FIG. 16 shows an example of the user information database 261. A leftmost column of the user information database 261 shown in FIG. 16 is a "user information" field in which personal information of users are described.

The "user information" field has sub-fields in which user name "Daisuke Suzuki", mail address "suzuki@xxx.co.jp", address "1-2-3 ***-cho, Shinjuku-ku, Tokyo", telephone number "03-xxxx-xxxx", credit card number "0123456789", and price "\123456" are described starting from the top in FIG. 16. Furthermore, below those sub-fields, a sub-field "purchase history" is described.

In the field of "purchase history", information about merchandise purchased in the past by the user, in terms of merchandise name, purchase date/time, price, etc., is recorded. Below the "purchase history" field, a field of "other information" is provided.

In a column on the right-hand side, an "importance level" defined for each item of personal information is described, wherein the "importance level" may have one of values from 1 to 5 corresponding to five importance levels. More specifically, the name is set 1 in importance level, the mail address to 1, the address to 2, the telephone number to 4, the credit card number to 5, the price to 5, the purchase history to 1, and the other information to 1. Each item may be set to a default importance level or may be set to an arbitrary value specified by the user.

In step S54, the world management program 242 searches the user information database 261 to determine which items of information are requested and determine the importance levels of the respective items of the requested information. For example, in a case in which the user name, the address, and the credit card number are requested, the world management program 242 searches the user information database 261 shown in FIG. 16 and detects the importance level of the name as 1, the address as 2, and the credit card number as 5.

In step S55, the world management program 242 detects a highest importance level of those detected in step S54. For example, in the case in which the user name, the address, and the credit card number are requested, the world management program 242 compares the importance levels, that is, 1 assigned to the name, 2 assigned to the address, and 5 assigned to the credit card number, with each other, and determines that 5 assigned to the credit card number is the highest importance level. Although in the present example, it is assumed that the importance level increases with the value, values may be defined such that the importance level decreases with increasing value. The world management program 242 then examines the object database 262 to detect an object corresponding to the detected highest importance level.

FIG. 17 shows an example of the object database 262. In FIG. 17, importance levels are described in a column on the left-hand side, and objects corresponding to the respective importance levels are shown in a column on the right-hand side. The world management program 242 detects an object corresponding to the highest importance level from the object database 262. For example, in a case in which the detected highest importance level is 5, the world management program 242 detects an object corresponding to 5 in importance level, that is, detects a bag labeled "secret" assigned an importance level of 5 in FIG. 17.

In FIG. 17, no object is recorded in an object field corresponding to importance level 1. If the detected highest importance level is 1, an object is determined as follows. Objects are assigned to respective items of user's personal information as shown in FIG. 18.

In FIG. 18, items of information are described in a column on the left-hand side, and objects corresponding to the respective items of information are described in a column on the right-hand side. More specifically, in the column on the left-hand side of FIG. 18, name", "mail address", "address," "telephone number", "credit card number", "money", "purchase history", and "other information" are described from the top to the bottom, and objects corresponding to those items are described in the column on the right-hand side.

In the case in which the detected highest importance level is 1, objects corresponding to all items of information to be transmitted from the client computer 6 to the mail-order sales server 11 are extracted.

After determining the object corresponding to the highest importance level of the information, the process proceeds to step S56.

In step S56, the world management program 242 commands the display program 243 to display a screen for prompting the user to select whether or not to permit transmission of the information. In response, the display program 243 displays the screen for prompting the user to select whether or not to permit transmission of the information, as shown in FIGS. 19 and 20.

Figure 19:
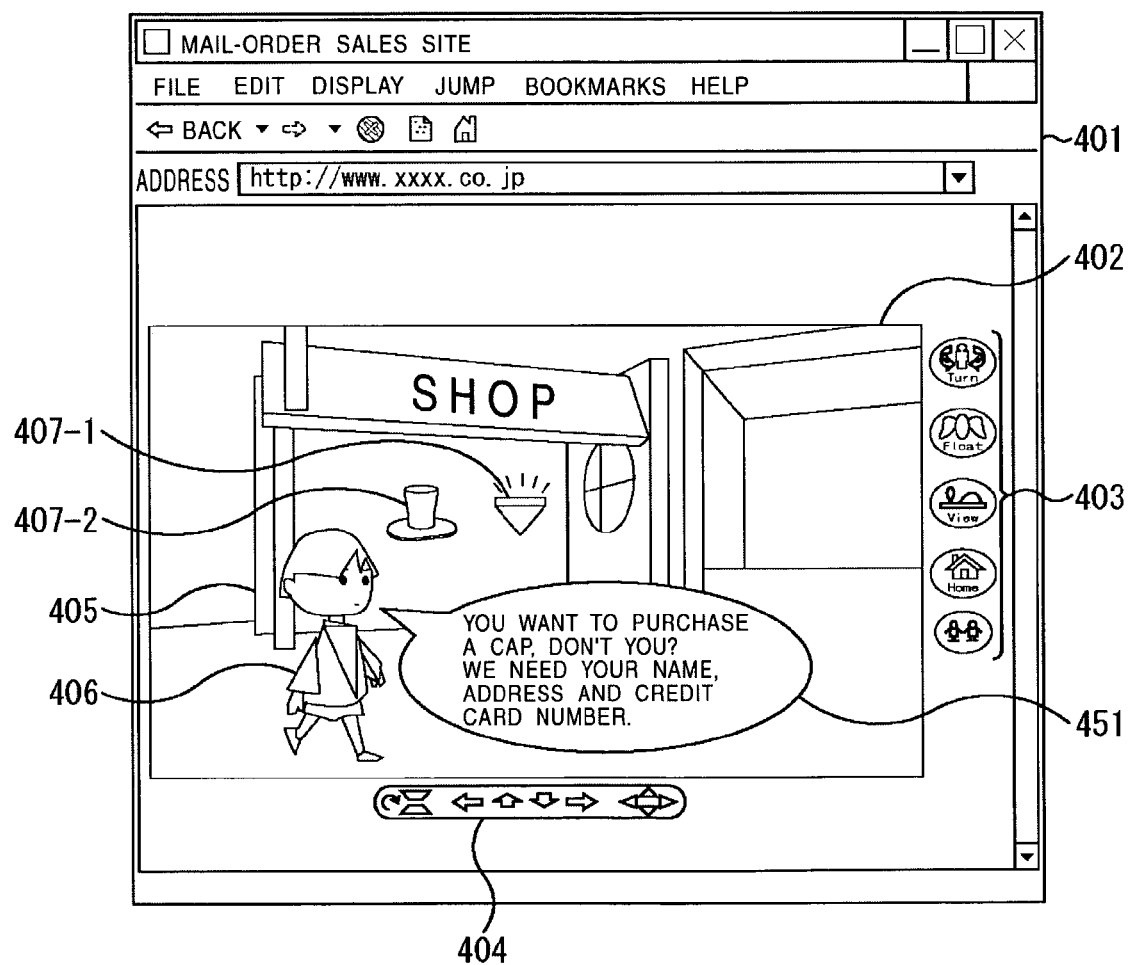
FIG. 19 is a diagram showing an example of an image displayed on a display of a client computer.

For example, if the user selects a merchandise icon 407-2 in FIG. 12, then a message "You want to purchase a cap, don't you? We need your name, address, and credit card number." from an shop agent 406 is displayed as denoted by reference numeral 451 in FIG. 19. From this message, the user can understand that to purchase the merchandise (cap), it is necessary to transmit the name, the address, and the credit card number of the user to the mail-order sales server 11.

Figure 20:
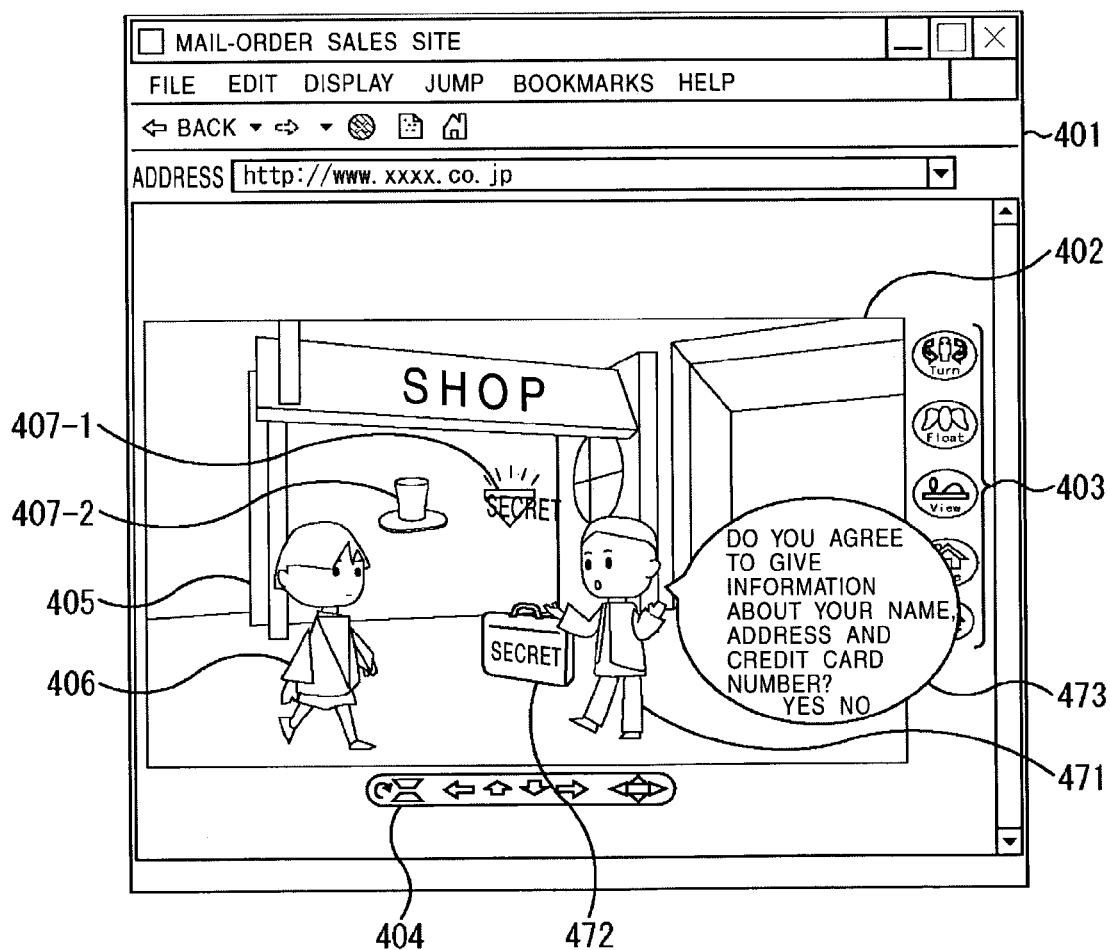
FIG. 20 is a diagram showing another example of an image displayed on the display of the client computer.

After the screen shown in FIG. 19 is displayed for several seconds, the display program 243 displays a screen shown in FIG. 20 on the display 208. In FIG. 20, an information providing agent 471 and an object 472 are displayed to the right of the shop agent 406. As for the object 472 displayed in the screen shown in FIG. 20, the object determined in step S55 is displayed. As described above, by displaying an object corresponding to an importance level of information, it becomes possible to intuitively recognize the importance level of the information to be transmitted. The object 472 may be displayed in the form of a 3-dimensional image. The object 472 is displayed at a location close to the information providing agent 471.

A message from the information providing agent 471 is displayed as "Do you agree to give information about your name, address, and credit card number? Yes/No" is displayed as denoted by reference numeral 473. From this message 473, the user can understand that the user is prompted to select whether or not to permit transmission of the personal information. If the user clicks "Yes" in the message 473 with the mouse (operation unit 206), transmission of the personal information is permitted. Conversely, if the user clicks "No" in the message 473 with the mouse (operation unit 206), transmission of the personal information is rejected.

After the screen shown in FIG. 20 is displayed on the display 208 by the display program 243, the process proceeds to step S57. In step S57, on the basis of operation information provided by the input monitor program 241, the world management program 242 determines whether "Yes" in the message 473 has been clicked. If it is determined that "Yes" is not clicked, that is, if it is determined that "No" is clicked, the process proceeds to step S58.

In step S58, the world management program 242 command the display program 243 to delete the information providing agent 471 the object 472, and the message 473 shown in FIG. 20 from the image displayed on the display 208 thereby changing the screen to that shown in FIG. 12. In response, the display program 243 deletes the information providing agent 471 the object 472, and the message 473 from the image displayed on the display 208 thereby changing the screen to that shown in FIG. 12. Thereafter, the process proceeds to step S59.

In step S59, the world management program 242 commands the communication program 245 to transmit to the mail-order sales server 11 a message indicating that transmission of the personal information is rejected. In response, the communication program 245 transmits to the mail-order sales server 11 the message indicating that transmission of the personal information is rejected. Thereafter, the process returns to step S51, and step S51 and following steps are repeated.

If the CPU 51 of the mail-order sales server 11 receives via the communication unit 60 the message transmitted in step S59 from the client computer 6 to inform that transmission of the personal information is rejected, then, in step S84 in FIG. 15, the CPU 51 determines that the personal information is not received from the client computer 6 and the CPU 51 terminates the purchase/sell process.

On the other hand, in the case in which in step S57 in FIG. 13, the world management program 242 determines that "Yes" in the message 473 is clicked, the process proceeds to step S60 in FIG. 14.

In step S60, the world management program 242 commands the display program 243 to move the object 472 from the location close to the information providing agent 471 to a location close to the shop agent 406.

Figure 21:
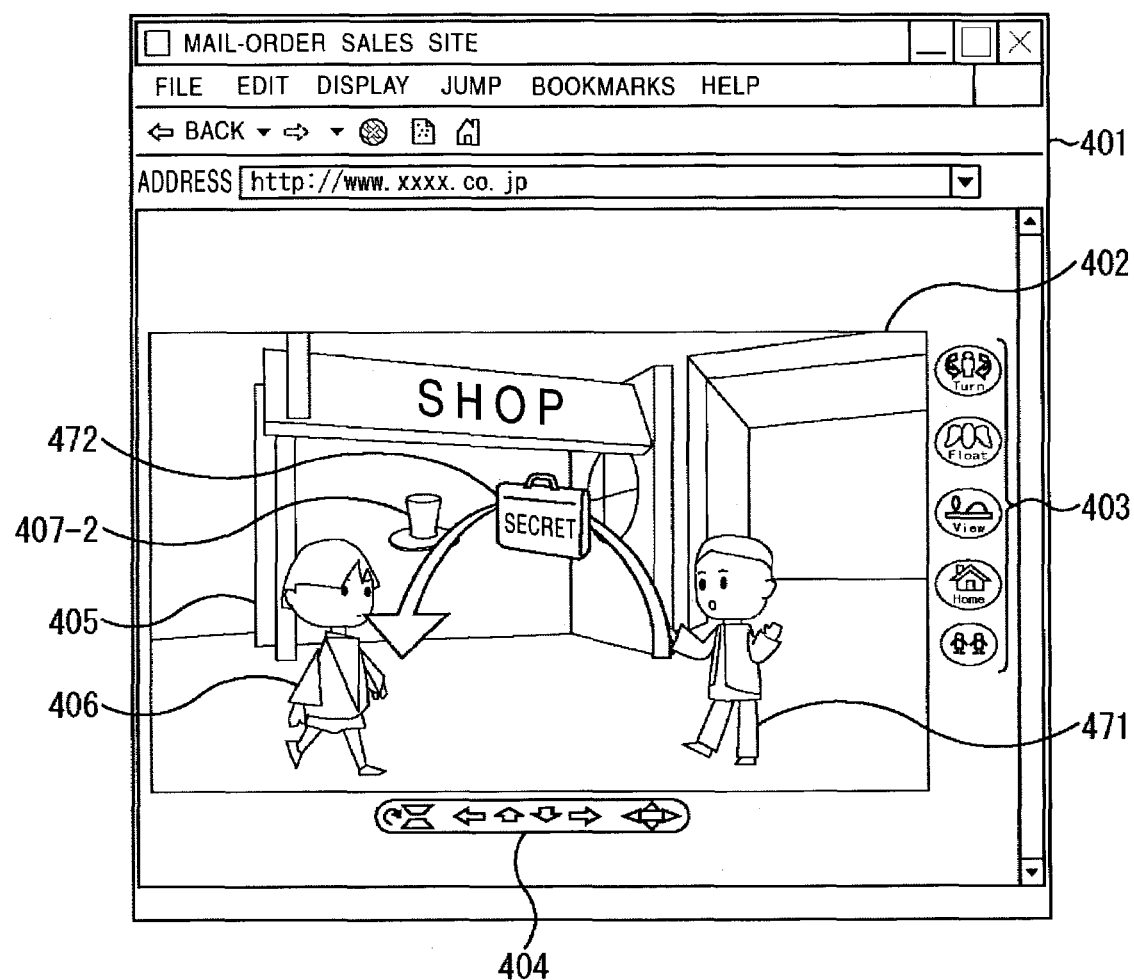
FIG. 21 is a diagram showing still another example of an image displayed on the display of the client computer.

FIG. 21 shows an example of a trajectory along which the object 472 displayed on the display 208 is moved. In FIG. 21, the object 472 displayed on the display 208 is moved from the information providing agent 471 to the shop agent 406 along the curved trajectory from the information providing agent 471 to the shop agent 406. The speed at which the object is moved from the information providing agent 471 to the shop agent 406 is set to be low enough so that the user can click the object 472 with the mouse (operation unit 206). For example, the speed is set so that it takes 10 to 30 sec for the object 472 to move from the information providing agent 471 to the shop agent 406.

In step S60, the object 472 starts moving from the information providing agent 471 to the shop agent 406 along the trajectory shown in FIG. 21. Note that the arrow indicating the trajectory shown in FIG. 21 is not actually displayed.

In step S61, on the basis of operation information provided by the input monitor program, the world management program 242 determines whether the object 472 moving from the information providing agent 471 to the shop agent 406 is clicked with the mouse (operation unit 206). If it is not clicked with the mouse (operation unit 206), the process proceeds to step S62.

In step S62, the world management program 242 determines whether the moving of the object 472 from the information providing agent 471 to the shop agent 406 is completed. If the movement of the object 472 from the information providing agent 471 to the shop agent 406 is not completed yet, the process returns to step S61, and step S61 and following steps are repeated.

Figure 22:
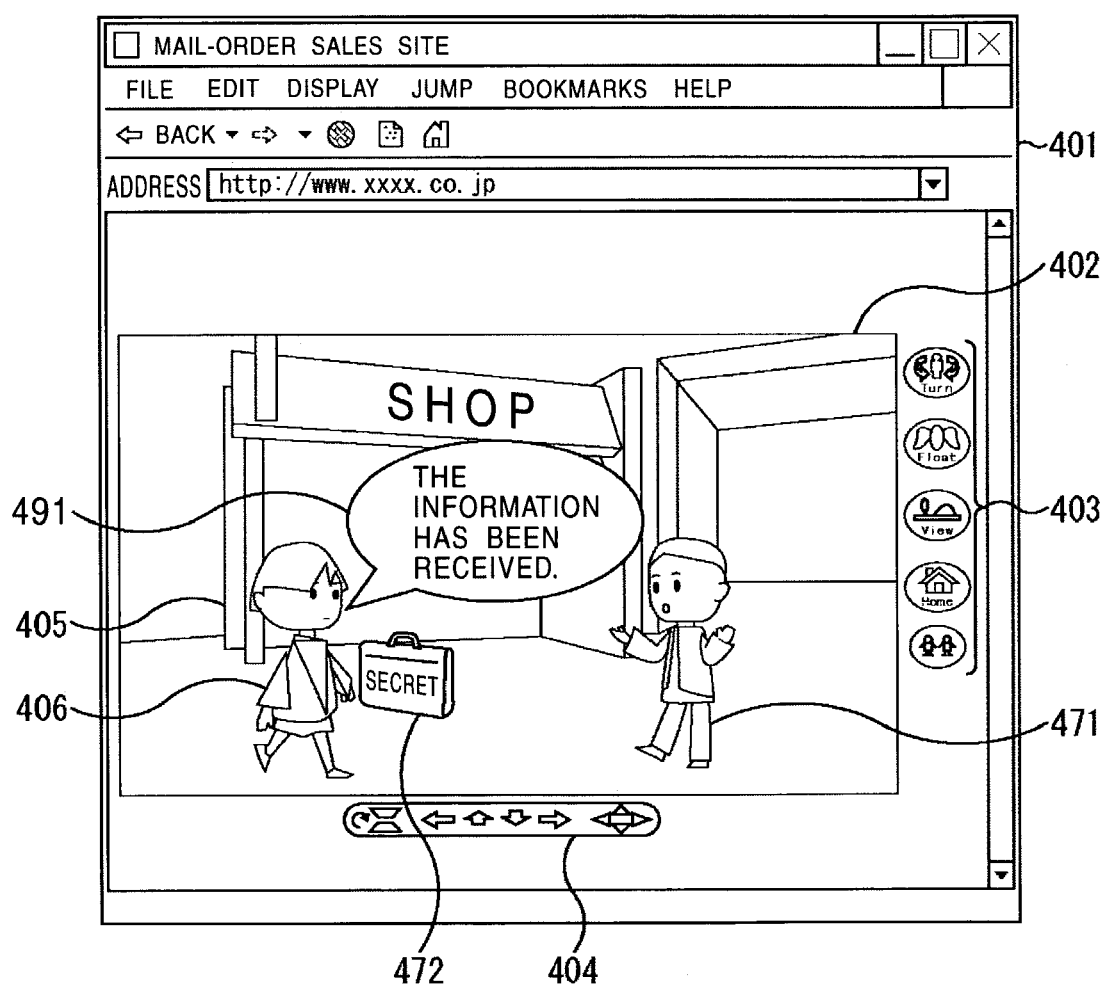
FIG. 22 is a diagram showing an example of an image displayed on the display of the client computer.

If, in step S62, the world management program 242 determines that the movement of the object 472 from the information providing agent 471 to the shop agent 406 is completed, the world management program 242 requests the display program 243 to display a screen such as that shown in FIG. 22 on the display 208. Thus, as shown in FIG. 22, the object 472 is displayed close to the shop agent 406 and a message 491 from the shop agent 406 is displayed as "Information has been surely received." From the message 491, the user can understand that the information has been transferred (at this stage of the process, the information has not been actually transmitted). Thereafter, the process proceeds to step S63.

In step S63, the world management program 242 commands the communication program 245 to transmit information (indicating, for example, the name, the address, and the credit card number of the user) necessary to purchase the merchandise to the mail-order sales server 11. In response, the communication program 245 transmits the information (indicating, for example, the name, the address, and the credit card number of the user) necessary to purchase the merchandise to the mail-order sales server 11. In the above process, the information is transmitted from the communication unit 210 of the client computer 6 to the mail-order sales server 11 via the network 1.

In the case in which the items of information necessary to purchase the merchandise are the name, the address, and the credit card number of the user, the user name "Daisuke Suzuki", the address "1-2-3 ***-cho, Shinjuku-ku, Tokyo", and the credit card number "0123456789", shown in FIG. 16, are transmitted from the client computer 6 to the mail-order sales server 11.

If the CPU 51 of the mail-order sales server 11 receives via the communication unit 60 the personal information transmitted in step S63 from the client computer 6, then, in step S84 in FIG. 15, the CPU 51 determines that the private information has been received from the client computer 6, and thus the process proceeds to step S85.

In step S85, the CPU 51 of the mail-order sales server 11 determines whether or not the received personal information includes all necessary items and whether or not the received personal information includes invalid information. That is, the CPU 51 of the mail-order sales server 11 determines whether or not the received personal information includes all items necessary to sell the merchandise. For example, in the case in which the items of private information necessary to purchase the merchandise are the name, the address, and the credit card number of the user, the CPU 51 of the mail-order sales server 11 determines whether the name, the address, and the credit card number of the user have all been received.

Secondary, the CPU 51 of the mail-order sales server 11 determines whether all items of the received private information are valid. For example, it is determined whether the address of the user is a true address and the credit card number is a correct number. If the CPU 51 of the mail-order sales server 11 determines that all necessary items of private information have been received and that all items of the received private information are valid, the process proceeds to step S86.

In step S86, the CPU 51 of the mail-order sales server 11 transmits to the financial server 5 a request for transfer of money corresponding to the price of the merchandise from an account of the user to an account of the mail-order dealer 2. The request includes the credit card number of the user.

Figure 23:
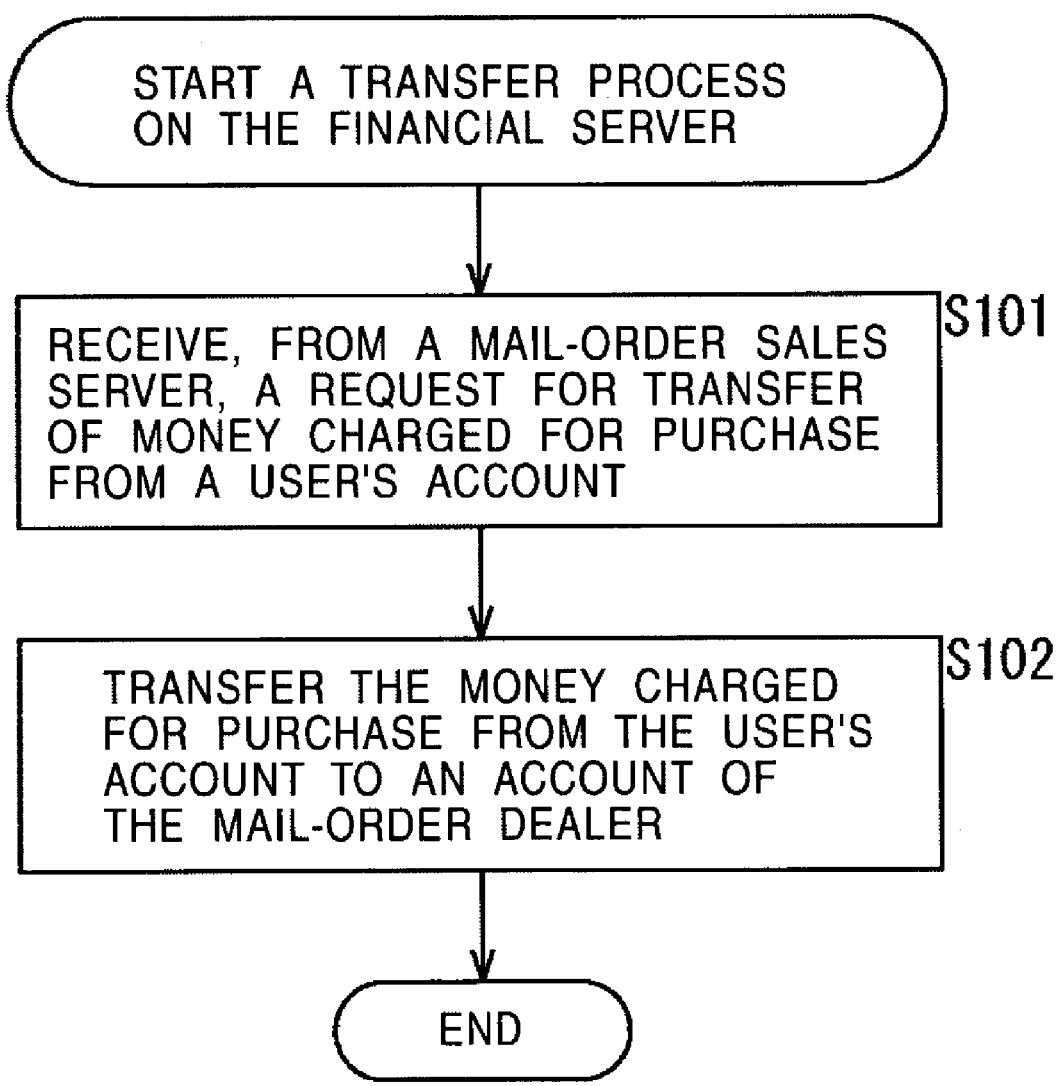
FIG. 23 is a flow chart showing a process of transferring money for payment, performed by a financial server.

In step S101 in FIG. 23, the financial server 5 receives the request transmitted in step S86 from the mail-order sales server 11. In step S102, in accordance with the received request, the financial server 5 transfers money for payment of the merchandise from the account of the user to the account of the mail-order dealer 2. This transfer process is performed on the basis of the credit card number of the user received from the mail-order sales server 11.

Referring again to FIG. 15, in step S87, the CPU 51 of the mail-order sales server 11 registers in the orderer registration database 94 the user, who has issued in step S86 the request for payment, as the destination to which the merchandise should be sent. In this registration step, the merchandise code of the merchandise ordered by the user and the user's name, address, and credit card number are registered in the orderer registration database. In a later step, mail-order dealer 2 will send the merchandise corresponding to the merchandise code to the user registered herein in the orderer registration database 94.

In step S88, the CPU 51 of the mail-order sales server 11 transmits a message indicating the completion of the procedure to the client computer 6 via the communication unit 60.

If step S63 is completed, then in step S64, the world management program 242 of the client computer 6 starts a timer set to a predetermined timeout value (1 min, for example) and monitors whether the message indicating the completion of the procedure is received from the mail-order sales server 11 before the timeout period has elapsed. If the message, transmitted in step S88 by the mail-order sales server 11 to notify that the procedure is completed, has been received via the communication unit 210 within the predetermined timeout period, then, in step S64, the world management program 242 determines that the message indicating the completion of the procedure has been received, and thus the process proceeds to step S65.

In step S65, the world management program 242 describes the purchase date, the purchase time, the merchandise name, the merchandise code, and the price of the merchandise in the purchase history database 263 thereby updating the purchase history database 263, and the purchase/sell process is ended.

However, if the message indicating the completion of the procedure transmitted in step S88 by the mail-order sales server 11 is not received via the communication unit 210 in the predetermined timeout period, then, in step S64, the world management program 242 of the client computer 6 determines that the message indicating the completion of the procedure is not received in the predetermined timeout period, and thus the process proceeds to step S66.

Figure 24:
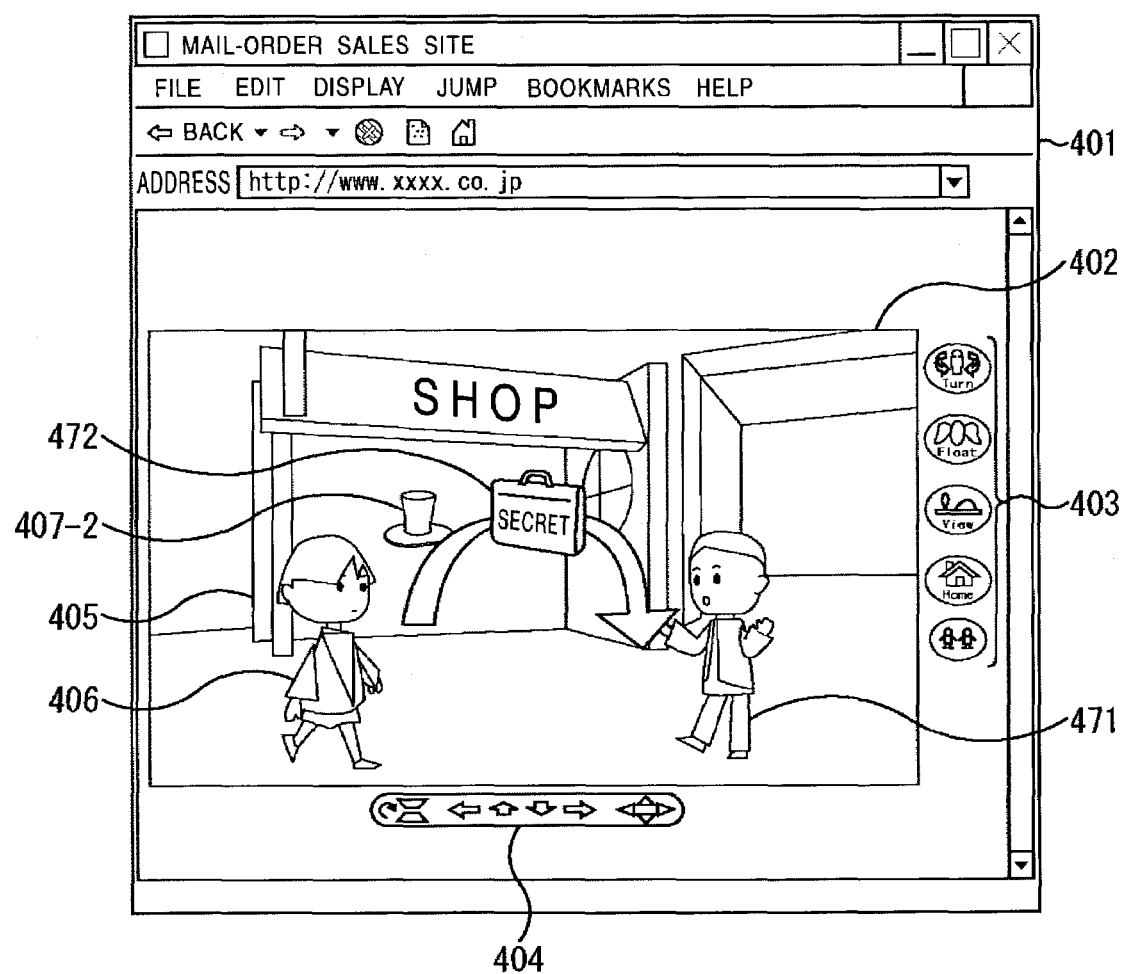
FIG. 24 is a diagram showing an example of an image displayed on the display of the client computer.

In step S66, the world management program 242 commands the display program 243 to display a screen, such as that shown in FIG. 24, on the display 208. In the screen displayed in step S66, an object 472 is displayed close to the shop agent 406.

In step S67, the world management program 242 commands the display program 243 to move the object 472 from the location close to the shop agent 406 to a location close to the information providing agent 471.

That is, in FIG. 24, the displayed object 472 is moved from the shop agent 406 to the information providing agent 471 along a curved trajectory from the shop agent 406 to the information providing agent 471. The speed of the object 472 may be set so that it takes, for example, 5 sec for the object to move from the shop agent 406 to the information providing agent 471. Note that the arrow shown in FIG. 24 to indicate the movement of the object 472 is not actually displayed. After completion of moving the object 472 to the information providing agent 471, the process proceeds to step S68.

Figure 25:
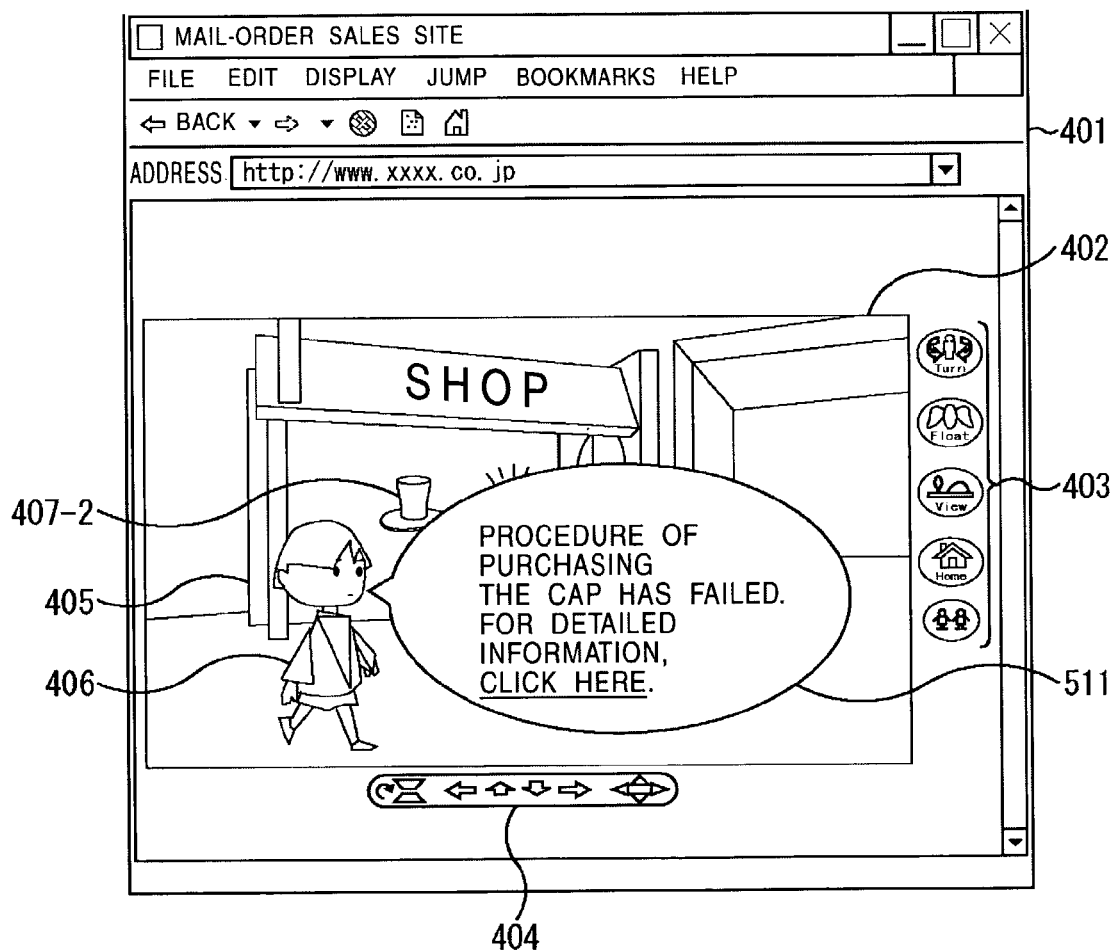
FIG. 25 is a diagram showing another example of an image displayed on the display of the client computer.

In step S68, the world management program 242 commands the display program 243 to display a screen, such as that shown in FIG. 25, on the display 208. In the screen shown in FIG. 25, the information providing agent 471 and the object 472 shown in FIG. 24 are no longer displayed, but a message 511 "Procedure of purchasing the cap has failed. For further detailed information, click here." issued by the shop agent 406 is displayed. From this message 511, the user can know that the procedure of purchasing the merchandise has failed. In the message 511 shown in FIG. 25, a part "click here" is underlined. By clicking the part "click here" with the mouse (operation unit 206), the user can get information indicating the reason why the procedure of purchasing the merchandise has failed.

Also in the case in which the CPU 51 of the mail-order sales server 11 determines, in step S81 in the flow chart shown in FIG. 15, that necessary information is not included in the received private information or that the received private information includes invalid information, steps S66 to S68 described above are performed on the client computer 6.

In step S85 of the flow chart shown in FIG. 15, if the CPU 51 of the mail-order sales server 11 determines that necessary information is not included in the received private information or that the received private information includes invalid information, the process jumps to step S89.

In step S89, the CPU 51 of the mail-order sales server 11 transmits a message indicating that purchasing of the merchandise is impossible to the client computer 6 via the communication unit 60.

In this case, if the communication unit 210 receives via the communication unit 210 the message transmitted in step S89 from the mail-order sales server 11, then, in step S64, the world management program 242 determines that the message indicating the completion of the procedure is not received from the mail-order sales server 11 within the predetermined timeout period, and thus the process proceeds to step S66 to perform step S66 and following steps.

Figure 26:
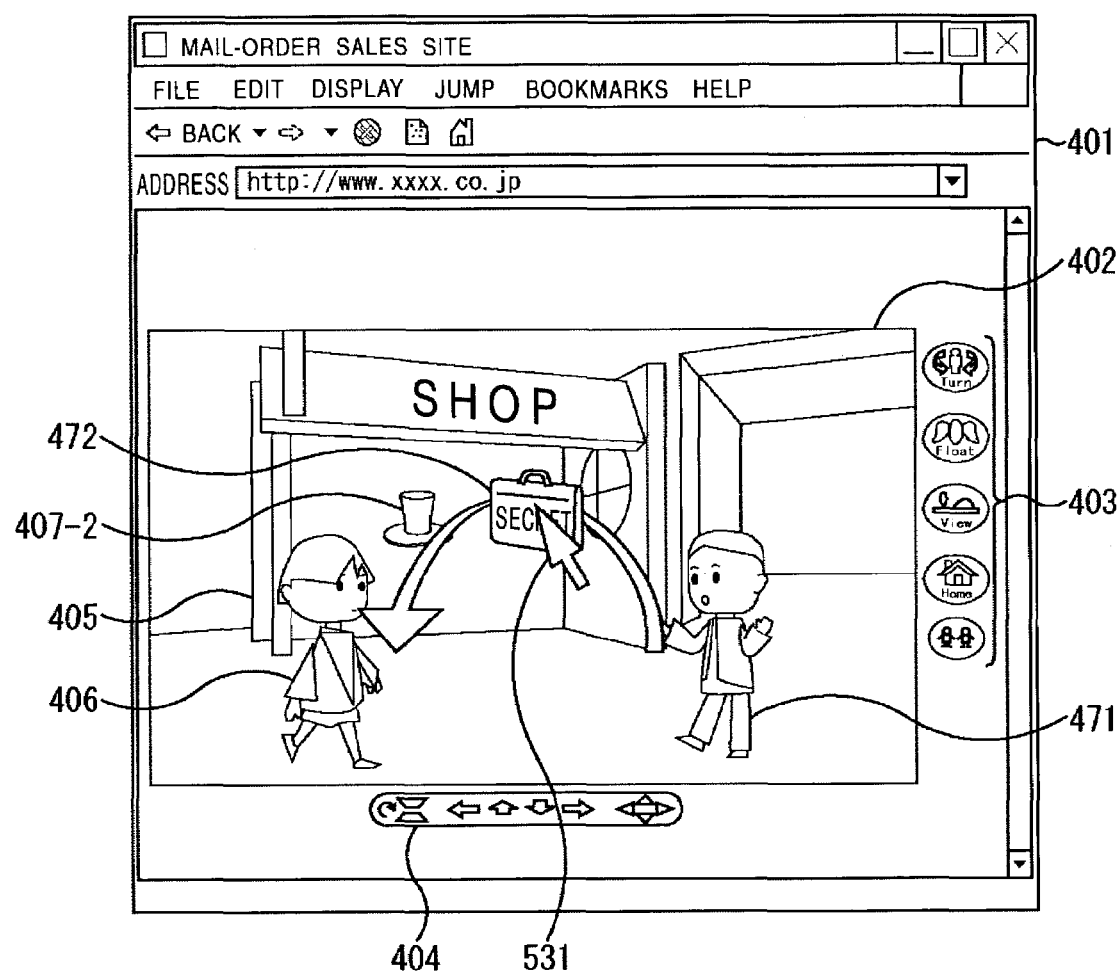
FIG. 26 is a diagram showing still another example of an image displayed on the display of the client computer.

Referring again to FIG. 14, in step S61, if the world management program 242 determines that the object 472 moving from the information providing agent 471 to the shop agent 406 is clicked with the mouse (operation unit 206), the process proceeds to step S69. More specifically, as shown in FIG. 26, if a cursor of the mouse 531 is put on the object 472 moving from the information providing agent 471 to the shop agent 406 and if the mouse is clicked, the process proceeds to step S69. Note that the arrow shown in FIG. 26 to indicate the movement of the object 472 is not actually displayed.

Figure 27:
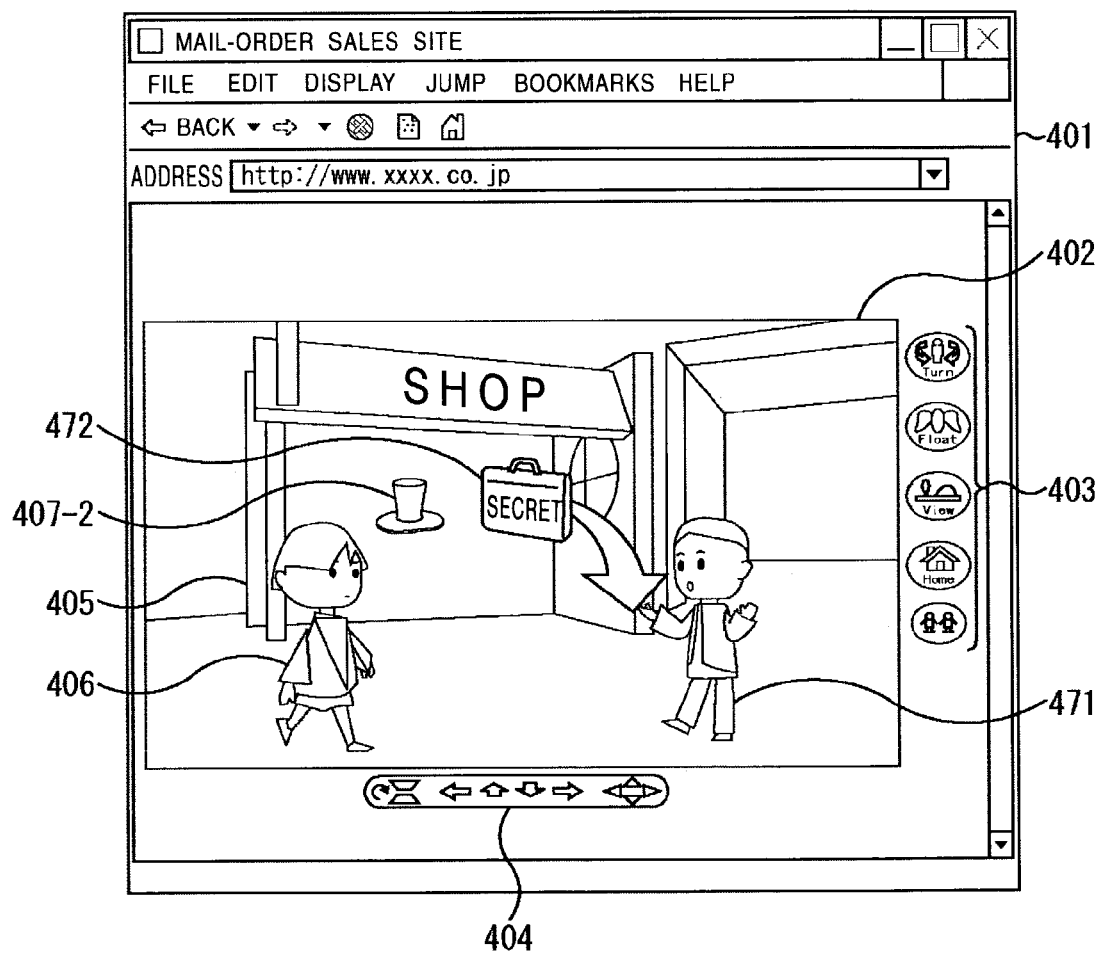
FIG. 27 is a diagram showing an example of an image displayed on the display of the client computer.

In step S69, the world management program 242 commands the display program 243 to display a screen, such as that shown in FIG. 27, on the display 208. In FIG. 27, the object 472 moving in FIG. 26 in a direction from the information providing agent 471 to the shop agent 406 stops and starts moving in an opposite direction along the same trajectory from the shop agent 406 to the information providing agent 471. Note that the arrow shown in FIG. 27 to indicate the movement of the object 472 is not actually displayed.

After completion of step S69, the process returns to step S56 in FIG. 13 and step S56 and following steps are repeated.

The purchase/sell process performed between the client computer 6 and the mail-order sales server 11 has been described above. In this process, as described above, by displaying an object corresponding to the importance level of information to be transmitted, it becomes possible for a user to intuitively recognize the importance level of the information to be transmitted (that is, to intuitively recognize how important the information is).

Figure 28:
FIG. 28 is a diagram showing a timing of transmitting information.

As described above with reference to steps S60 to 63 performed on the client computer 6, the timing of actually transmitting private information from the client computer 6 to the mail-order sales server 11 (step S63) is after the completion of transferring the object 472, displayed on the display 208 of the client computer 6, from the information providing agent 471 to the shop agent 406. FIG. 28 shows the timing of transferring the object 472, on the display 208, from the information providing agent 471 to the shop agent 406 and also shows the timing of actually transmitting the private information.

In FIG. 28, "display process" denotes the process of transferring the object 472, on the display 208, from the information providing agent 471 to the shop agent 406, and "transmission process" denotes the process of actually transmitting the private information. In FIG. 28, the horizontal axis represents the time. The display process is performed for a period from t1 to t2, and the transmission process is performed for a period from t2 to t3. The period of time from t1 to t2 (that is, a period of time, t2−t1, during which the display process is performed) may be set to, for example, 30 sec. On the other hand, the period of time from t2 to t3 (that is, a period of time, t3−t2, during which the transmission process is performed) may be set to, for example, 1 sec or shorter.

Conventionally, when information is transmitted (for example, when a file is uploaded), a dialogue indicating the transmission status is displayed at the same time as the transmission of the information. However, in this case, when a user wants to cancel the transmission of the information in the middle of the transmission process, a part of the information has already been transmitted. When transmission of important information which should be kept secret is cancelled, it is not desirable, from the point of view of security, that even a part of the information be transmitted. In the present invention, to avoid the above problem, the actual transmission of information is performed at time t2 after completion of the display process, as described above with reference to steps S60 to S63 in FIG. 14.

That is, by performing the transmission process at time t2 immediately after the completion of the display process, it becomes possible for a user to cancel the transmission of information without transmitting even any part of the information, because actual transmission is not performed until the display process is completed.

Conventionally, when online shopping is performed in a 3-dimensional virtual space, a window for displaying a payment Web page is displayed on a display 208 of a personal computer 6 separately from the 3-dimensional virtual space so that information to be transmitted is input via the displayed separate window. Employing such a window for displaying a payment Web page displayed separately from the 3-dimensional space makes it impossible to provide all service in a consistent manner only via the single 3-dimensional virtual space.

In contrast, in the present invention, all services are provided via the single 3-dimensional virtual space without having to open an additional Web page for payment.

Figure 29:
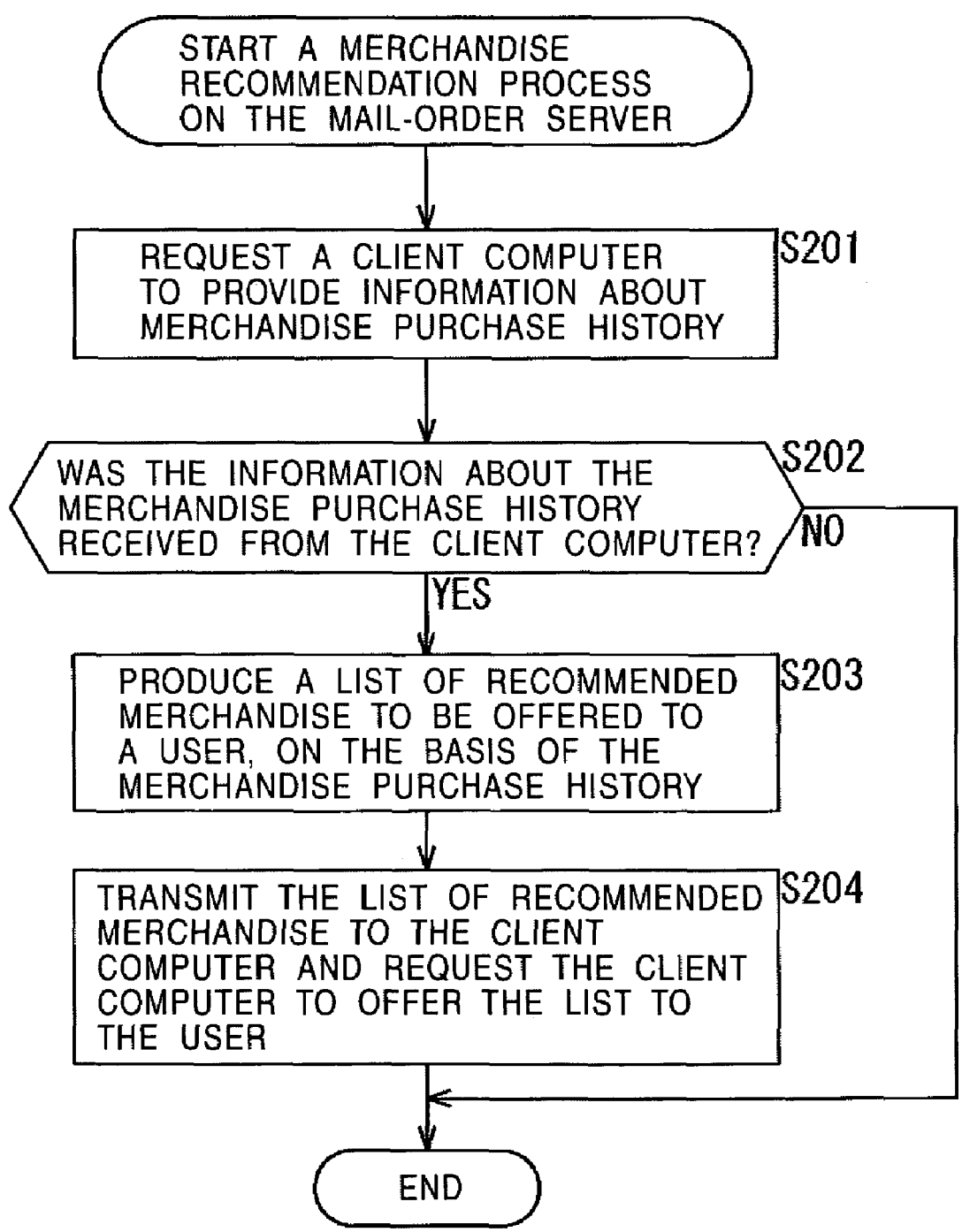
FIG. 29 is a flow chart associated with a merchandise recommendation process performed by the mail-order sales server.
Figure 30:
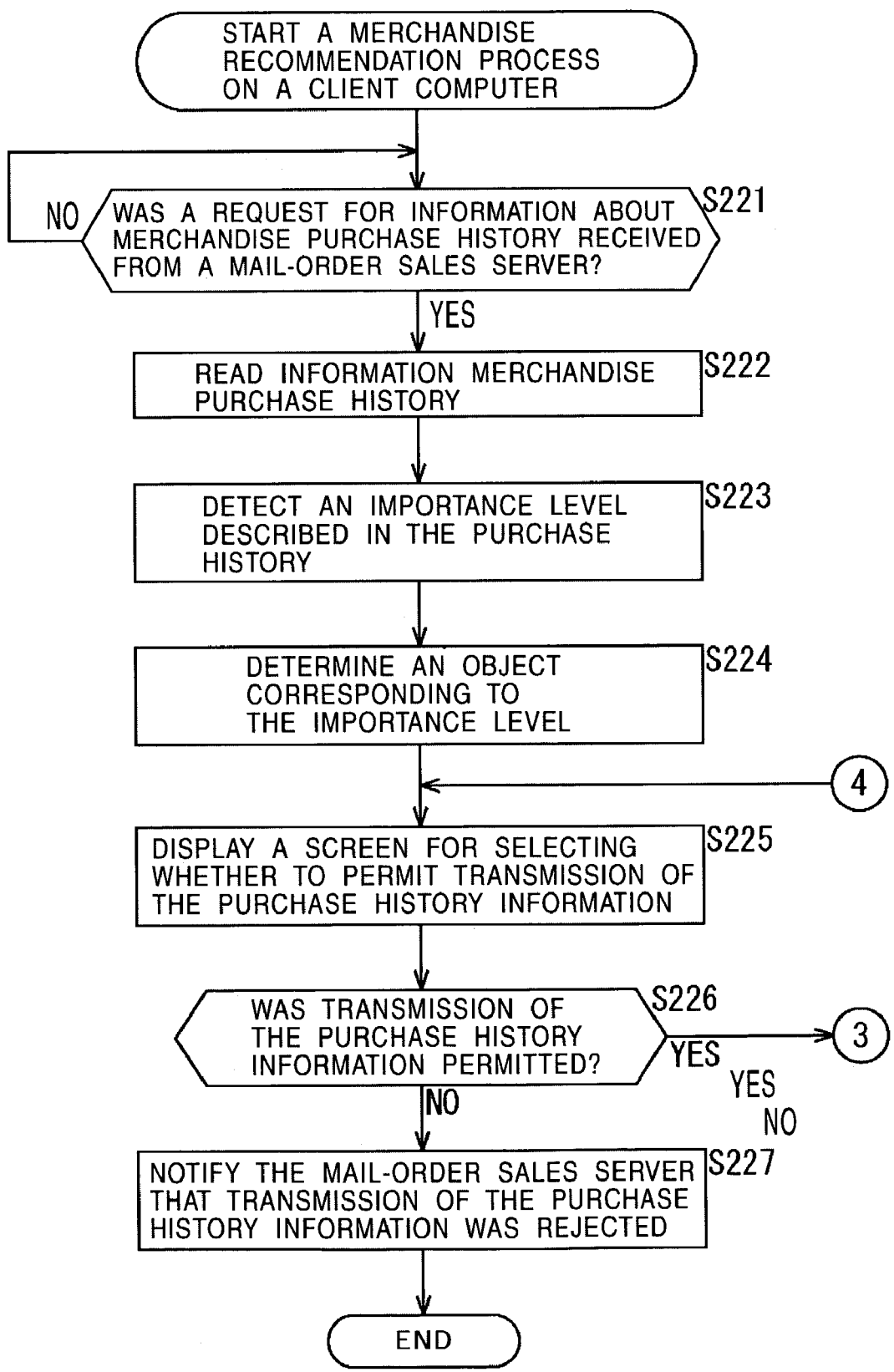
FIG. 30 is a flow chart showing a part of a merchandise recommendation process performed by a client computer.
Figure 31:
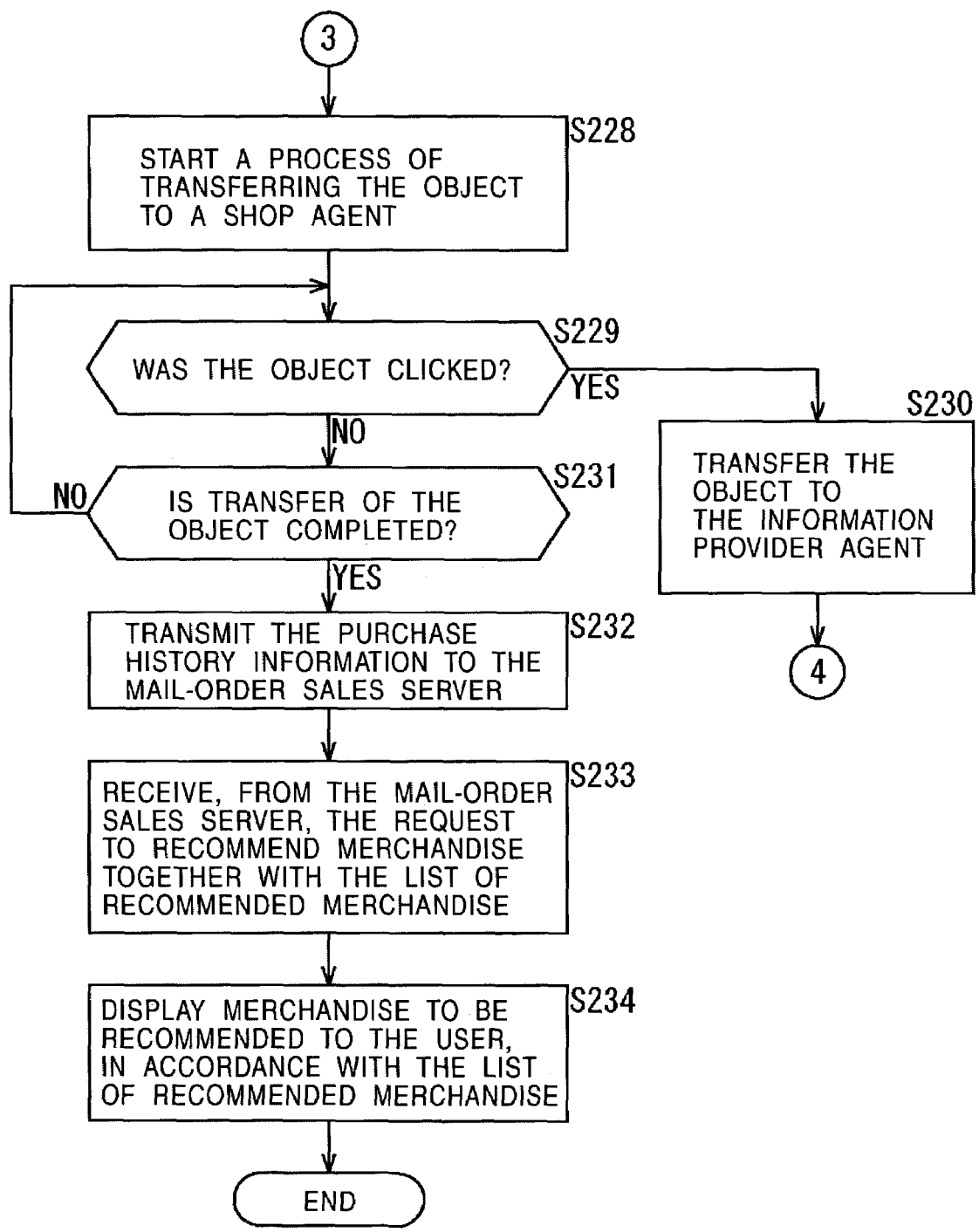
FIG. 31 is a flow chart showing another part of the merchandise recommendation process performed by the client computer.
Figure 33:
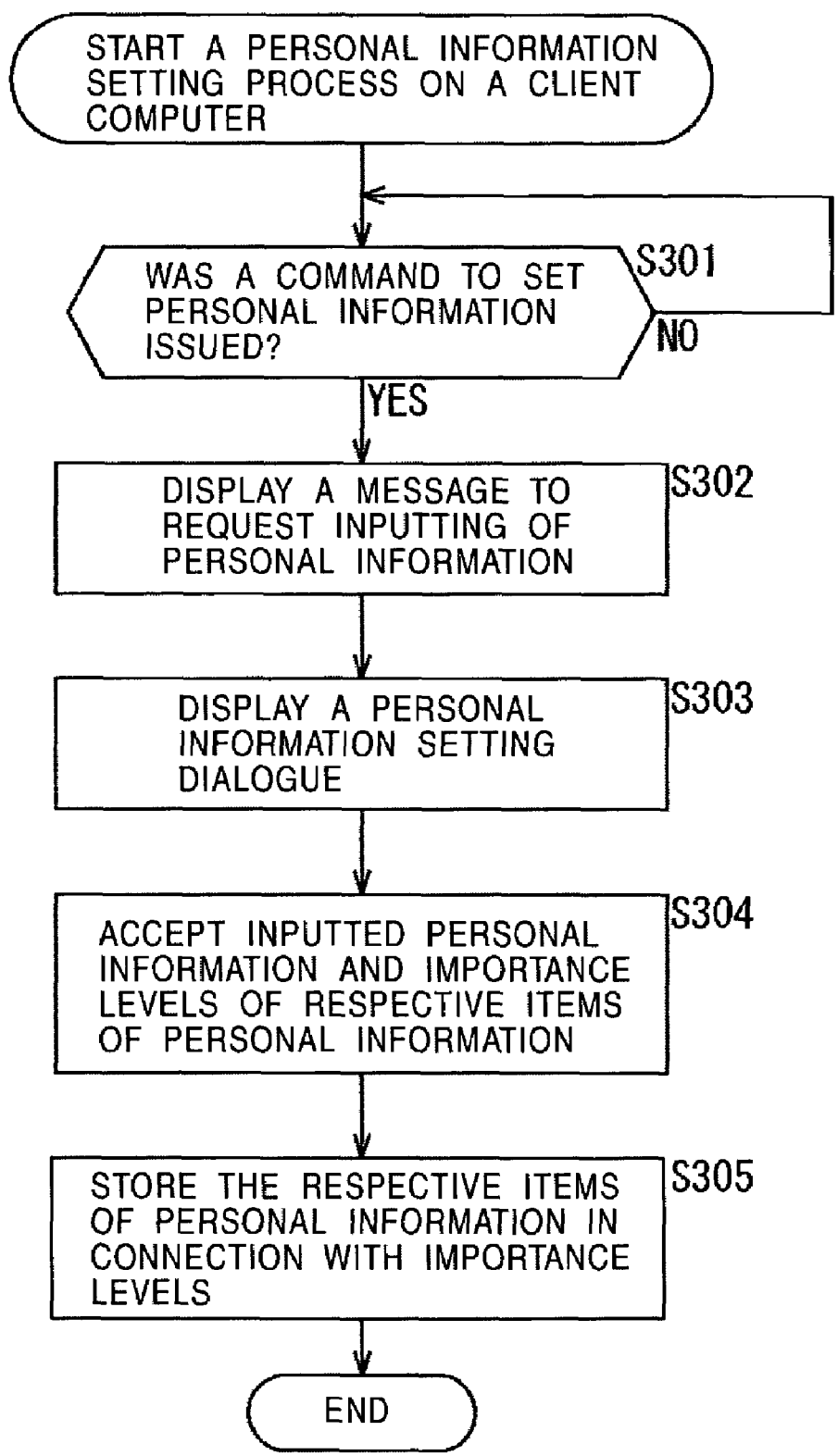
FIG. 33 is a flow chart showing a process of setting personal information, performed by a client computer.

In the present invention, it is possible to select merchandise expected to be liked by users on the basis of purchase history of respective users and recommend the selected merchandise to users. Now, referring to flow charts shown in FIGS. 29 to 31, a process of recommending merchandise is described below. The flow chart shown in FIG. 29 represent a process performed by the mail-order sales server 11, and the flow charts shown in FIG. 30 and FIG. 31 represent a process performed by the client computer 6. In the following description, processes of the client computer 6 are performed by the CPU 201 by executing various programs. Processes of the mail-order sales server 11 are performed by the CPU 51 by executing various programs.

In step S201 in FIG. 29, the CPU 51 of the mail-order sales server 11 transmits a request for merchandise purchase history, from the communication unit 60 to the client computer 6 via the network 1. The request may be transmitted at scheduled intervals (for example, once every week), or may be transmitted at arbitrary times specified by a manager of the mail-order sales server 11.

The world management program 242 of the client computer 6 waits in step S221 in FIG. 30, until communication information provided from the communication program 245 indicates that the request for the purchase history has received. If the client computer 6 receives via the communication unit 210 the request for the purchase history transmitted in step S201 from the mail-order sales server 11, the process proceeds to step S222.

In step S222, the world management program 242 reads purchase history from the purchase history database 263. FIG. 32 shows an example purchase history recorded in the purchase history database 263. In the purchase history database 263, as shown in FIG. 32, data indicating a purchase day, a purchase time, a merchandise name, a merchandise code, and a price is described for each piece of merchandise purchased in the past by a user. The information shown in FIG. 32 is read in step S222.

Thereafter, in step S223, the world management program 242 examines the user information database 261 to detect the importance level assigned to the purchase history. More specifically, the world management program 242 detects the importance level of the purchase history as "1" from the user information database 261 shown in FIG. 16.

In step S224, the world management program 242 retrieves an object corresponding to the detected importance level from the object database 262. More specifically, the world management program 242 retrieves an object corresponding to an importance level of "1" from the object database 262 shown in FIG. 17. In the example shown in FIG. 17, no object is defined for the importance level of "1". In this case, the world management program 242 employs an object assigned to the purchase history in the 2nd row as counted from the bottom in FIG. 18.

In step S225, the world management program 242 commands the display program 243 to display a screen for prompting the user to select whether or not to permit transmission of the purchase history. In response, the display program 243 displays the screen for prompting the user to select whether or not to permit transmission of the information, as shown in FIG. 20. However, in this step S225, the message 473 "Do you agree to give information about your name, address and credit card number? Yes/No" shown in FIG. 20 is replaced with a message "Do you agree to give information about your purchase history? Yes/No". Furthermore, in this step S225, the object 472 (bag labeled "secret") shown in FIG. 20 is replaced with the object detected in step S224 (in this specific example, the object assigned to the purchase history shown in FIG. 18). Hereinafter, such an object will be referred to as a purchase history object.

If the user clicks "Yes" in the message 473 with the mouse (operation unit 206), transmission of the purchase history is permitted. Conversely, if the user clicks "No" in the message 473 with the mouse (operation unit 206), transmission of the purchase history is rejected.

After the screen for prompting the user to select whether or not to permit transmission of the purchase history is displayed on the display 208 by the display program 243, the process proceeds to step S226. In step S226, on the basis of operation information provided by the input monitor program 241, the world management program 242 determines whether "Yes" in the message 473 has been clicked. If it is determined that "Yes" is not clicked, that is, if it is determined that "No" has been clicked, the process proceeds to step S227.

In step S227, the world management program 242 commands the communication program 245 to transmit to the mail-order sales server 11 a message indicating that transmission of the purchase history is rejected. In response, the communication program 245 transmits to the mail-order sales server 11 the message indicating that transmission of the purchase history is rejected. After that, the merchandise recommendation process performed on the client computer 6 is ended.

If the CPU 51 of the mail-order sales server 11 receives via the communication unit 210 the message transmitted in step S227 by the client computer 6 to inform that transmission of the purchase history is rejected, then, in step S202 in FIG. 29, the CPU 51 determines that the purchase history is not received from the client computer 6 and the CPU 51 terminates the merchandise recommendation process.

In step S226, if the world management program 242 determines that "Yes" in the message 473 is clicked, the process proceeds to step S228 in FIG. 31.

In step S228, the world management program 242 commands the display program 243 to move the object from the location close to the information providing agent 471 to a location close to the shop agent 406. The moving of the object is performed in a similar manner to that in step S60 described above with reference to FIG. 21. However, the object moved herein in this step S228 is not the object 472 (bag labeled "secret") shown in FIG. 21 but the purchase history object detected in step S224.

In step S229, on the basis of operation information provided by the input monitor program, the world management program 242 determines whether the purchase history object moving from the information providing agent 471 to the shop agent 406 is clicked with the mouse (operation unit 206). If it is clicked with the mouse (operation unit 206), the process proceeds to step S230.

In step S230, the world management program 242 commands the display program 243 to stop the purchase history object moving in the direction from the information providing agent 471 to the shop agent 406 and move it in an opposite direction from the shop agent 406 to the information providing agent 471.

After completion of step S230, the process return to step S225 in FIG. 30 and step S225 and following steps are repeated.

On the other hand, in the case in which the world management program 242 determines, in step S229, that the purchase history object moving from the information providing agent 471 to the shop agent 406 is not clicked with the mouse (operation unit 206), the process proceeds to step S231.

In step S231, the world management program 242 determines whether the moving of the purchase history object from the information providing agent 471 to the shop agent 406 is completed. If the moving of the purchase history object from the information providing agent 471 to the shop agent 406 is not completed yet, the process returns to step S229, and step S229 and following steps are repeated.

If, in step S231, the world management program 242 determines that the moving of the purchase history object from the information providing agent 471 to the shop agent 406 is completed, the world management program 242 commands the display program 243 to display a screen such as that shown in FIG. 22 on the display 208. Note that in this case, instead of the object 472, the purchase history object is displayed.

In step S232, the world management program 242 commands the communication program 245 to transmit the purchase history read in step S222 to the mail-order sales server 11. In response, the communication program 245 transmits the purchase history to the mail-order sales server 11. The purchase history is transmitted from the communication unit 210 of the client computer 6 to the mail-order sales server 11 via the network 1.

If the CPU 51 of the mail-order sales server 11 receives via the communication unit 60 the purchase history transmitted in step S232 from the client computer 6, then, in step S202 in FIG. 29, the CPU 51 determines that the purchase history has been received from the client computer 6, and the process proceeds to step S203.

In step S203, the CPU 51 of the mail-order sales server 11 records the received purchase history into the purchase history database 93. The mail-order sales server 11 also has data associated with purchase history of other users, and calculates tendency of user's preference for merchandise on the basis of the data of purchase history of users. Depending on the calculated tendency of user's preference, the CPU 51 of the mail-order sales server 11 produces a list of merchandise to be recommended to users. For example, the calculated tendency may indicate that users who often purchase supplements generally have a tendency to also purchase training machines. Thus, if the purchase history received in step S202 indicates that a user often purchases supplements, the CPU 51 of the mail-order sales server 11 produces a list of training machines to be recommended to that user.

In step S204, the CPU 51 of the mail-order sales server 11 transmits the list of recommended merchandise produced in step S203 (together with data associated with the merchandise) to the client computer 6 from the communication unit 60 via the network 1 and requests the client computer 6 to recommend the merchandise to the user.

In step S233 in FIG. 31, the client computer 6 receives via the communication unit 210 the list of recommended merchandise transmitted in step S204 from the mail-order sales server 11. In step S234, if the world management program 242 receives, from the communication program 245, communication information indicating that the list of recommended merchandise has been received, the world management program 242 commands the display program 243 to display a virtual shop on the display 208 and further display merchandise icons corresponding to merchandise to be recommended to the user in accordance with the received recommendation list. Thereafter, if the user decides to purchase recommended merchandise, the purchase/sell process described above with reference to the flow charts shown in FIGS. 13 to 15 is performed.

In order to make it possible to perform the purchase/sell process described above with reference to the flow charts shown in FIGS. 13 to 15 and the merchandise recommendation process described above with reference to the flow charts shown in FIGS. 29 to 31, users need to register personal information and importance levels in the user information database 261 in the client computer 6 in advance. More specifically, each user needs to register his name, mail address, residential address, telephone number, credit card number, and money in the user information database 261 shown in FIG. 16, in advance. The user may define arbitrary importance levels for the name, the mail address, the address, the telephone number, the credit card number, the money, the purchase history, and other information, respectively. Referring to a flow chart shown in FIG. 33, a process performed by the client computer 6 to set personal information and the importance levels of respective items of the personal information is described below.

A user can register his personal information in the client computer 6 by operating the operation unit 206 in accordance with a predetermined procedure. In step S301 in FIG. 33, the world management program 242 determines whether a command to set personal information is input, on the basis of operation information provided by the input monitor program 241. If the command to set personal information is not input yet, the world management program 242 performs step S301 repeatedly until the command to set personal information is input. If, in step S301, the world management program 242 determines that the command to set personal information has been input, the process proceeds to step S302.

Figure 34:
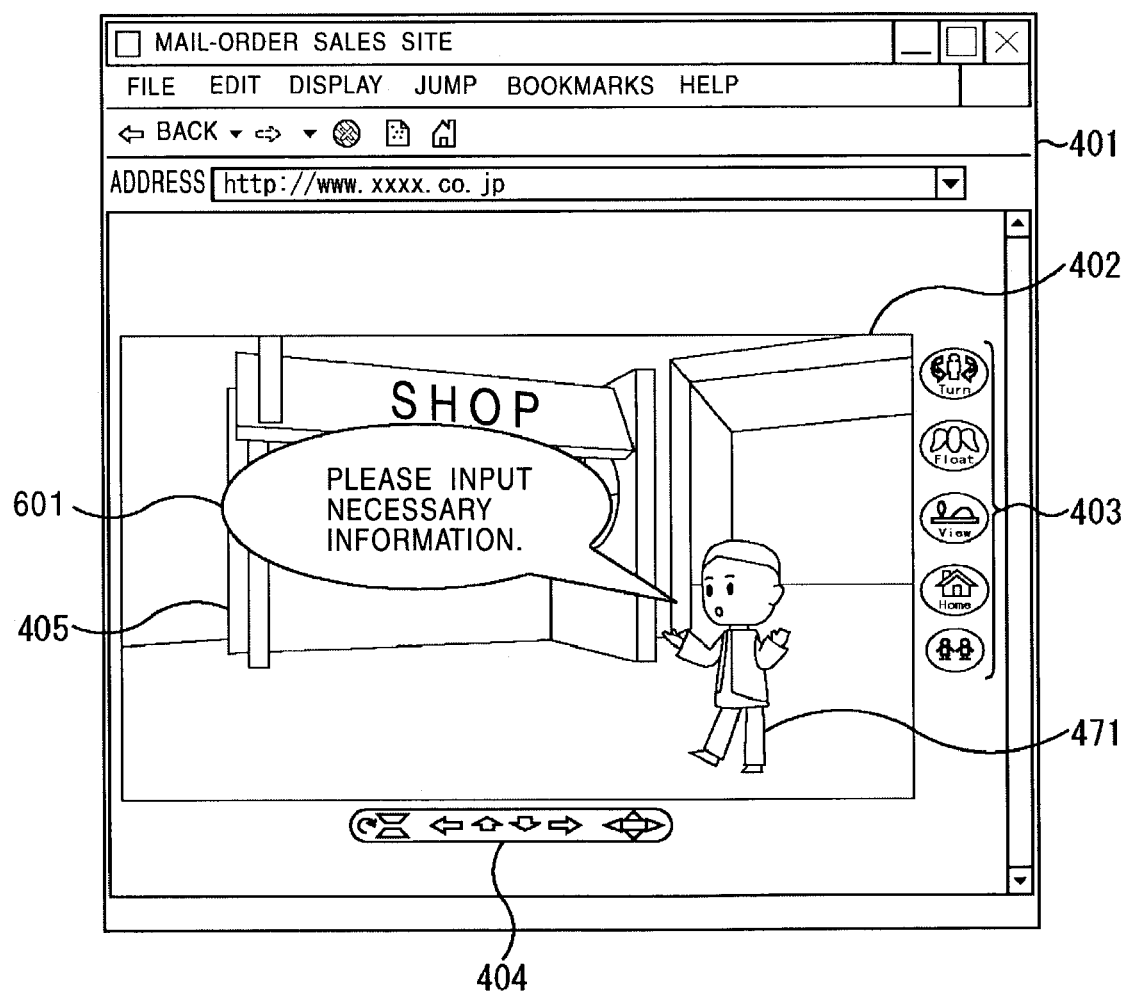
FIG. 34 is a diagram showing an example of an image displayed on a display of a client computer.

In step S302, the world management program 242 commands the display program 243 to display a screen, such as that shown in FIG. 34, on the display 208. In FIG. 34, a message 601 "Please input necessary information." from the information providing agent 471 is displayed. From this message 601, the user can understand that the user is prompted to input his/her personal information.

Figure 35:
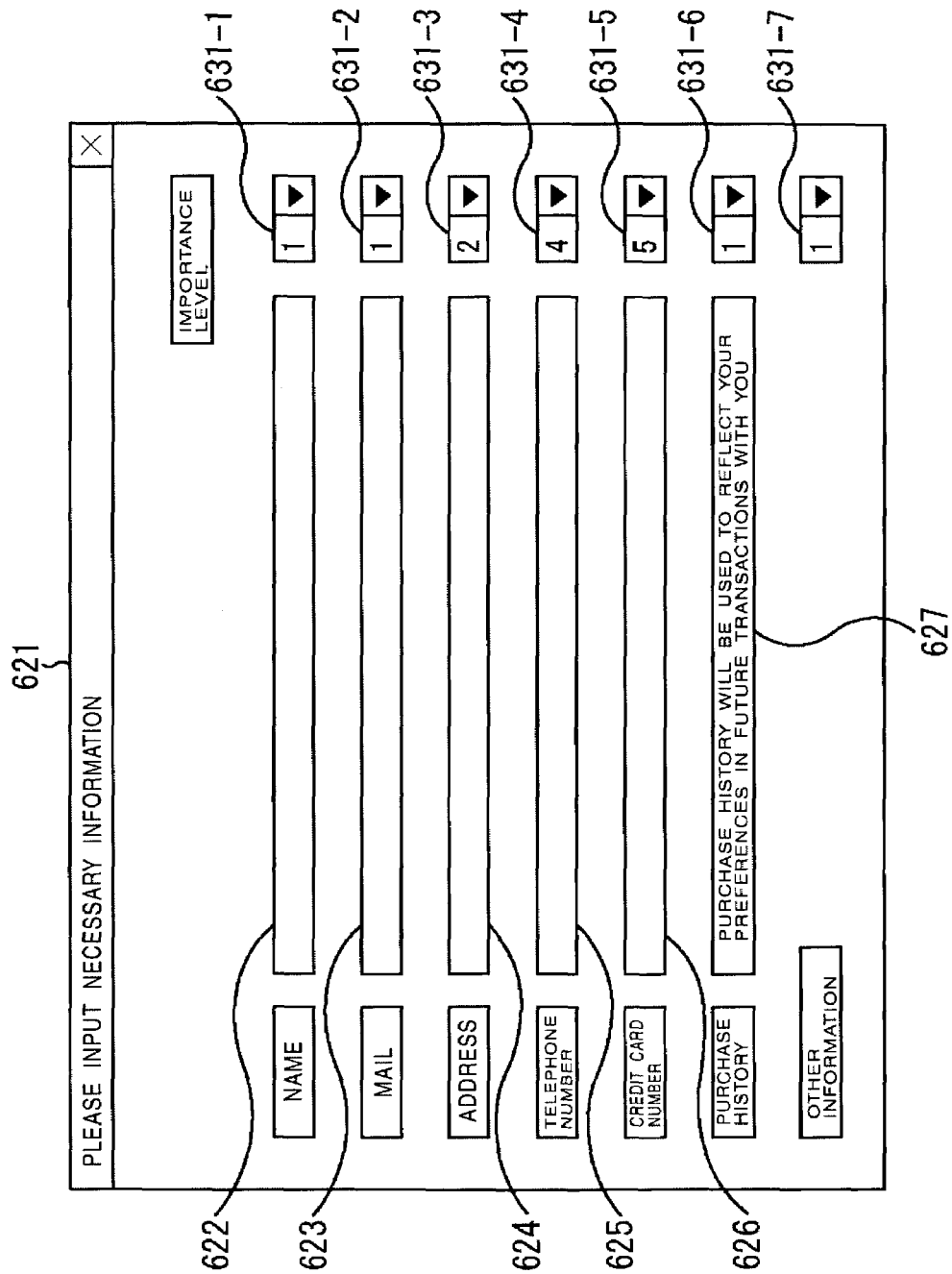
FIG. 35 is a diagram showing an example of a private information setting dialogue.
Figure 36:
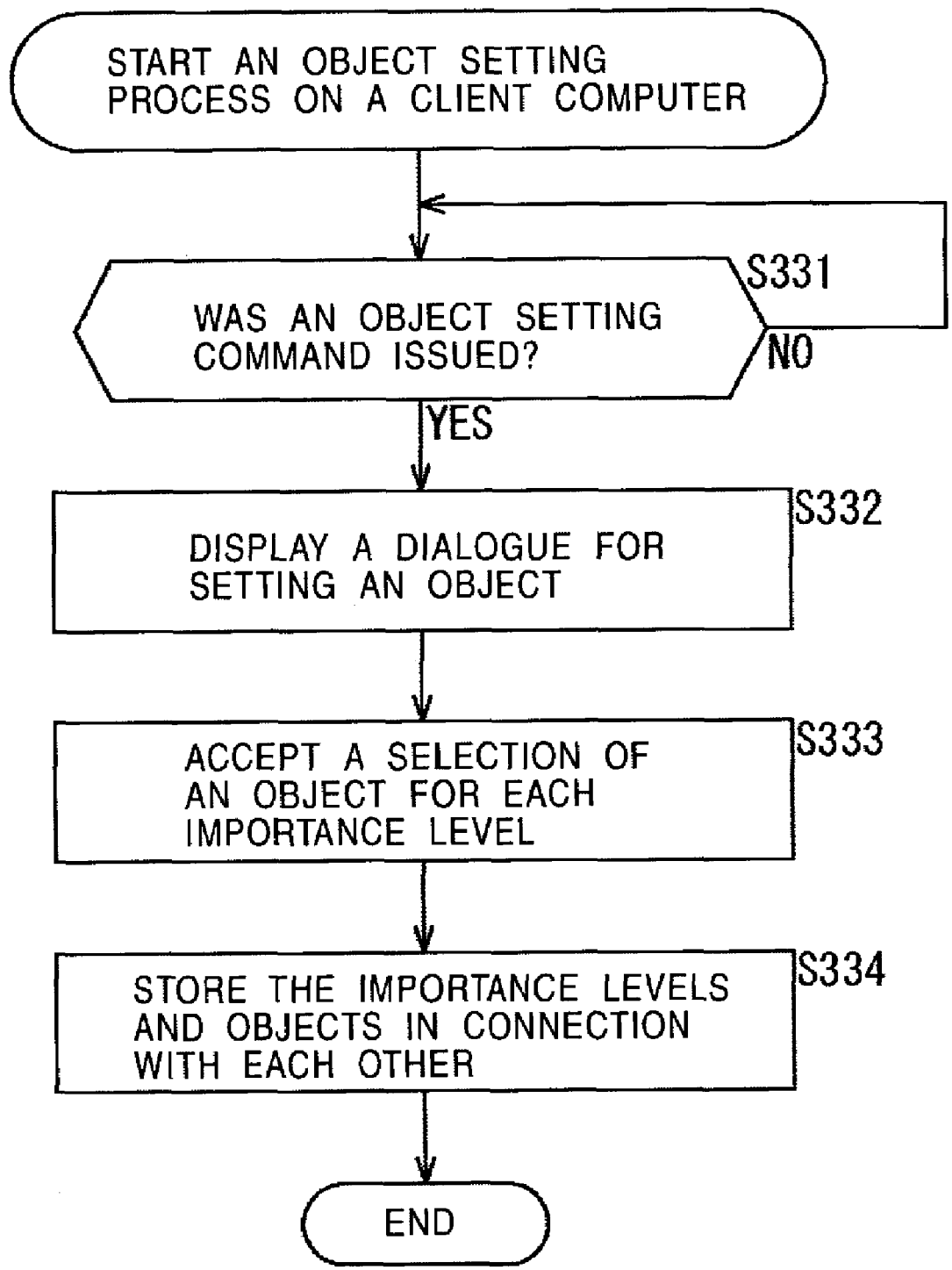
FIG. 36 is a flow chart showing an object setting process performed by a client computer.

After the screen shown in FIG. 34 is displayed for several seconds, the world management program 242 commands the display program 243 to display a private information setting dialogue 621, such as that shown in FIG. 35, on the display 208. The user inputs his/her personal information in specified fields in the private information setting dialogue 621 and sets importance levels for respective items of the personal information by operating the keyboard and/or the mouse (operation unit 208).

More specifically, a name field 622, a mail address field 623, an address field 624, a telephone number field 625, a card number field 626, and a purchase history message field 627 are displayed from the top to the bottom in a central area of the private information setting dialogue 621.

The user can input his/her name in the name field 622 by operating the operation unit 208. The user can input his/her mail address in the mail address field 623 by operating the operation unit 208. The user can input his/her address in the address field 624 by operating the operation unit 208. The user can input his/her telephone number in the telephone number field 625 by operating the operation unit 208. The user can input his/her credit card number in the card number field 626 by operating the operation unit 208. The user can select whether or not to save purchase history to receive recommendation of merchandise, by selecting the purchase history message field 627 by operating the operation unit 208.

In a right-hand area of the private information setting dialogue 621, an importance level field 631-1 for setting the importance level of the name, an importance level field 631-2 for setting the importance level of the mail address, an importance level field 631-3 for setting the importance level of the address, an importance level field 631-4 for setting the importance level of the telephone number, an importance level field 631-5 for setting the importance level of the credit card number, an importance level field 631-6 for setting the importance level of the purchase history, and an importance level field 631-7 for setting the importance level of other information are displayed from the top to the bottom.

The user can set each importance level to one of levels from 1 to 5 in the importance level fields 631-1 to 631-7 by operating the operation unit 208.

In step S304, the world management program 242 accepts the data associated with the personal information and the importance levels input via the private information setting dialogue 621 shown in FIG. 35.

After the inputting of the personal information and setting of the importance levels via the private information setting dialogue 621 are accepted, the process proceeds to step S305. In step S305, the world management program 242 records the personal information and the importance levels corresponding to the respective items of the personal information input via the private information setting dialogue 621 into the user information database 261. As a result, the user information database 261 such as that shown in FIG. 16 is stored in the storage unit 209.

Although in the above-described example, default objects are assigned to respective importance levels as shown in FIG. 17, a user may assign an arbitrary object to each importance level. Now, referring to a flow chart shown in FIG. 36, an object setting process performed by the client computer 6 is described.

The user can define an object for each importance level by operating the operation unit 206 in accordance with a predetermined procedure. In step S331 shown in FIG. 36, the world management program 242 determines whether an object setting command is input, on the basis of operation information provided by the input monitor program 241. If the object setting command is not detected, the world management program 242 performs step S331 repeatedly until the object setting command is input. If the world management program 242 determines, in step S331, that the object setting command is input, the process proceeds to step S332.

In the storage unit 209 of the client computer 6, candidates for objects employable for importance levels are stored in a predetermined order. In step S332, the world management program 242 commands the display program 243 to display the object setting dialogue. The object setting dialogue includes fields for specifying objects for respective importance levels from 1 to 5 (hereafter, such a field will be referred to as an object setting field). In each object setting field, one of object candidates stored in the storage unit 209 is displayed.

The user can change the object candidate currently displayed in each object setting field to a next object candidate by operating the operation unit 206. That is, the user can change the object candidate from one to another until a desirable object is displayed in the object setting field.

In step S333, the world management program 242 accepts the objects specified, via the object setting dialogue, for respective importance levels from 1 to 5. After completion of specifying the objects for all respective importance levels from 1 to 5, if the user performs a predetermined inputting operation on the operation unit 206, the process proceeds to step S334.

In step S334, the world management program 242 updates the object database 262 by describing the specified correspondence between the objects and the importance levels accepted in step S333 into the object database 262.

Thus, the object setting process is completed.

Now, a process performed by the client computer 6 to receive a content from the content server 21 is described below.

The content server 21 stores, in a content database 161, information associated with contents to provide to users. FIG. 37 shows an example of the content database 161. Note that although in the specific example shown in FIG. 37, music contents are described, by way of example, in the content database 161, the contents described in the content database 161 are not limited to music contents.

In the content database 161 shown in FIG. 37, information about "category", "artist name", "title code", "title", "price", "necessary user information", and "icon" are described from the leftmost column to the rightmost column. As for the "category", contents may be categorized, for example, into "new albums", "European music", and "Japanese music". Music contents which have recently been released are categorized into "new albums". Music contents played by European artists are categorized into "European music". Music contents played by Japanese artists are categorized into "Japanese music".

In the field of "artist name" in the second column as counted from the leftmost column in FIG. 37, artist names of artists playing music are described. In the field of "title code" in the third column as counted from the leftmost column in FIG. 37, codes identifying albums are described. In the field of "title" in the fourth column as counted from the leftmost column in FIG. 37, titles of albums are described. In the field of "price" in the fifth column as counted from the leftmost column in FIG. 37, prices needed to receive respective contents are described. In the field of "necessary user information" in the sixth column as counted from the leftmost column in FIG. 37, items of user information which are necessary when contents are transmitted are described. In the field of "icon" in the rightmost column in FIG. 37, icons, which are displayed in a virtual shop on the display 208 of the client computer 6, are described.

If the content server 21 receives, from the client computer 6, a request for transmission of merchandise (contents) to be displayed in the virtual shop, the content server 21 transmits information associated with contents described in the content database 161. For example, in a case in which a request for transmission of only information about albums categorized in "new albums" is received from the client computer 6, the content server 21 transmits only information about contents categorized in "new albums" to the client computer 6. When "European music" or "Japanese music" is specified, the process is performed in a similar manner. In a case in which a request for transmission of information about all contents is received from the client computer 6, the content server 21 transmits information about all contents to the client computer 6.

In accordance with the information about contents received from the content server 21, the client computer 6 displays icons corresponding to respective contents in the virtual shop displayed on the display 208. The process of displaying the virtual shop on the display 208 of the client computer 6 and further displaying icons of merchandise (contents) in the virtual shop is similar to that described in detail earlier with reference to the flow charts shown in FIGS. 9 and 10.

That is, in the shop display process between the client computer 6 and the mail-order sales server 11 described earlier with reference to the flow charts shown in FIGS. 9 and 10, the part of the process performed by the mail-order sales server 11 is performed in a similar manner by the content server 21. As a result, a virtual shop is displayed on the display 208 of the client computer 6 and icons corresponding to contents are displayed at particular locations in the virtual shop.

The user can select a desired content by specifying one of icons corresponding to icons displayed at the particular locations in the virtual shop. If a content is selected by the user, the content server 21 transmits the selected content to the client computer 6. Now, a process of transmitting a content corresponding to an icon selected by the user from those displayed in the virtual shop is described below with reference to flow charts shown in FIGS. 38 to 40. Although in the following description, it is assumed that music contents are transmitted, the contents transmitted by the content server 21 are not limited to music contents. When contents other than music contents are transmitted, the process is performed in a similar manner to that described below.

Figure 38:
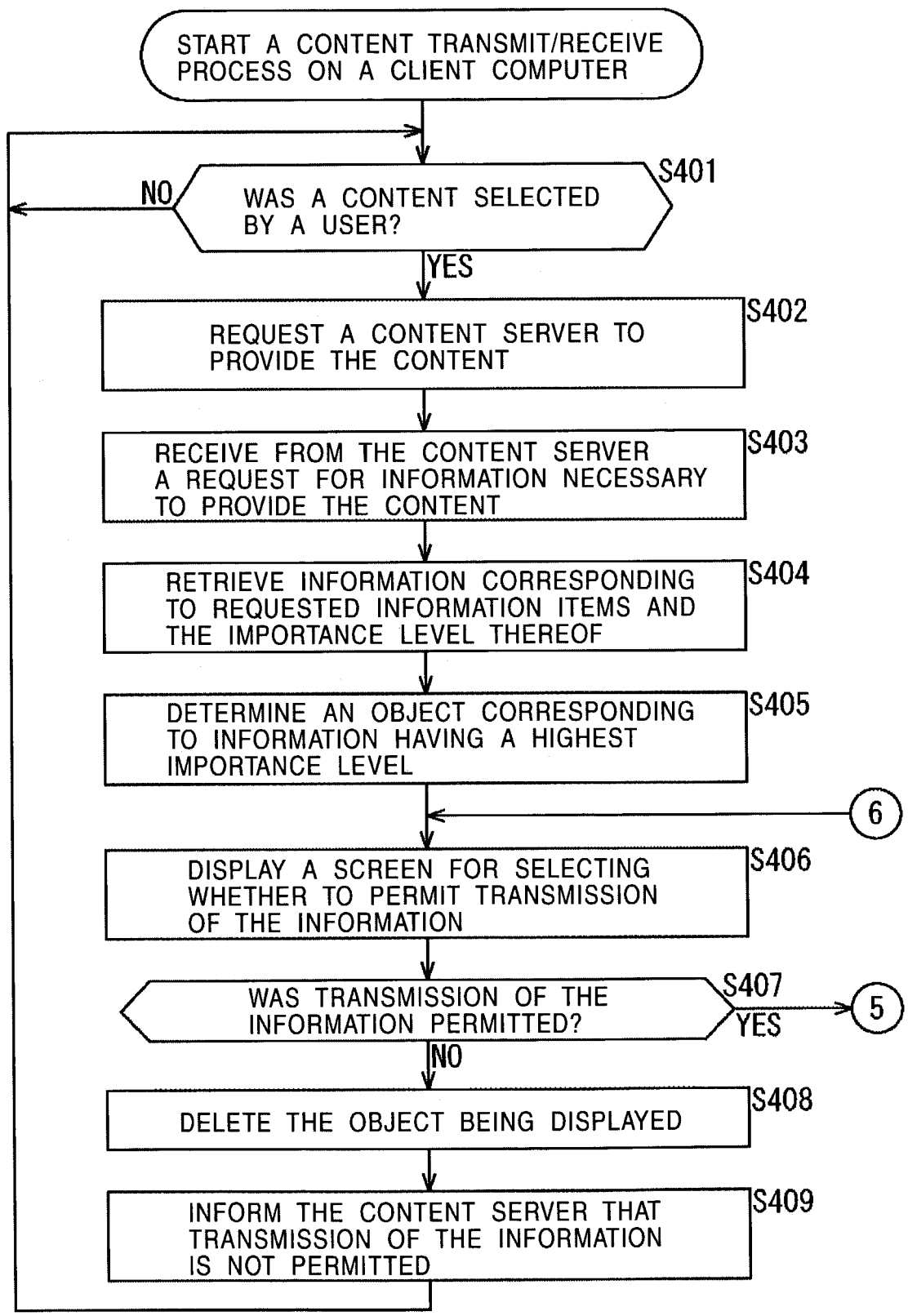
FIG. 38 is a flow chart showing a part of a content transmit/receive process performed by a client computer.
Figure 39:
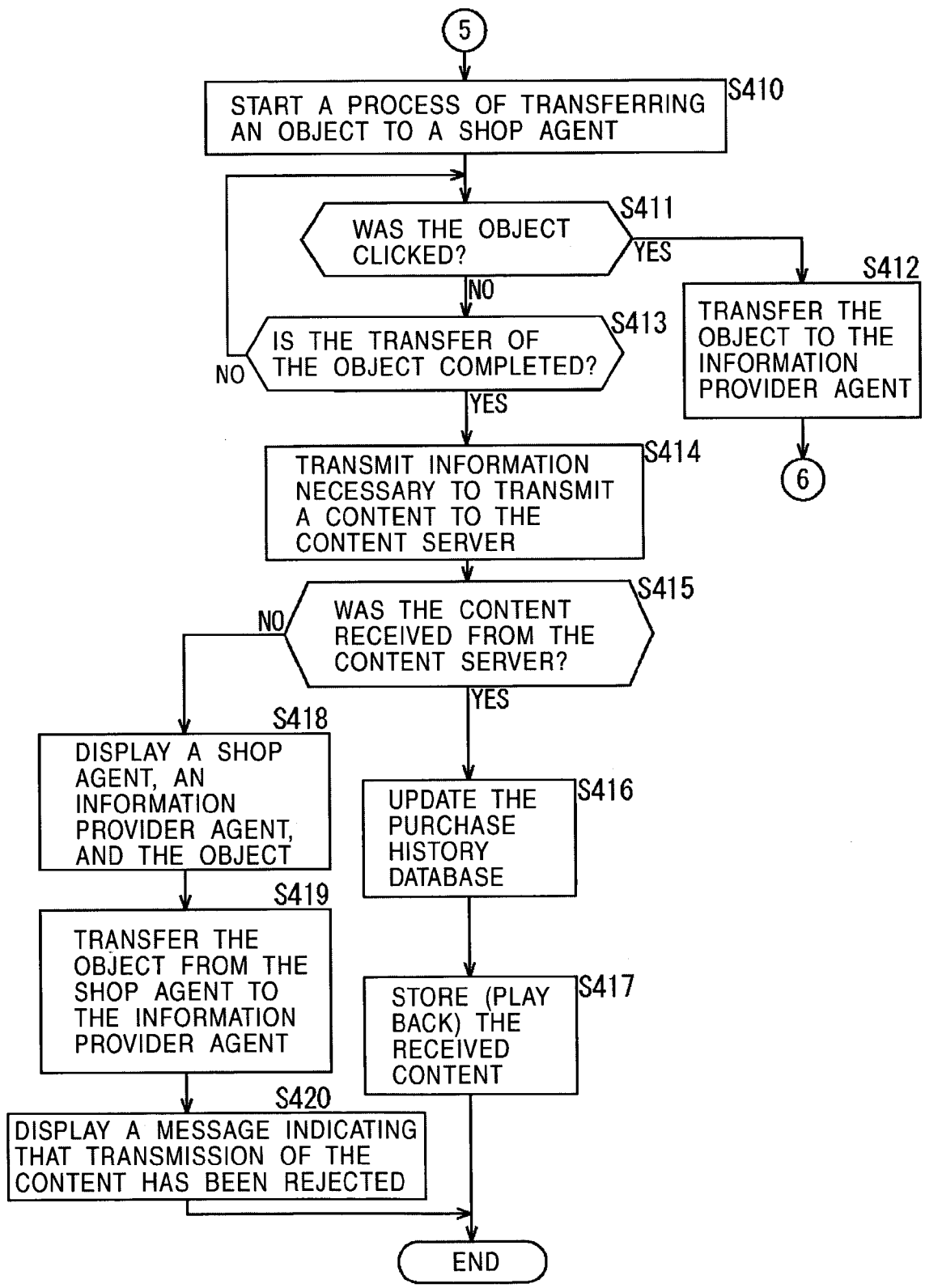
FIG. 39 is a flow chart showing a part, following that shown in FIG. 38, of the content transmit/receive process performed by the client computer.
Figure 40:
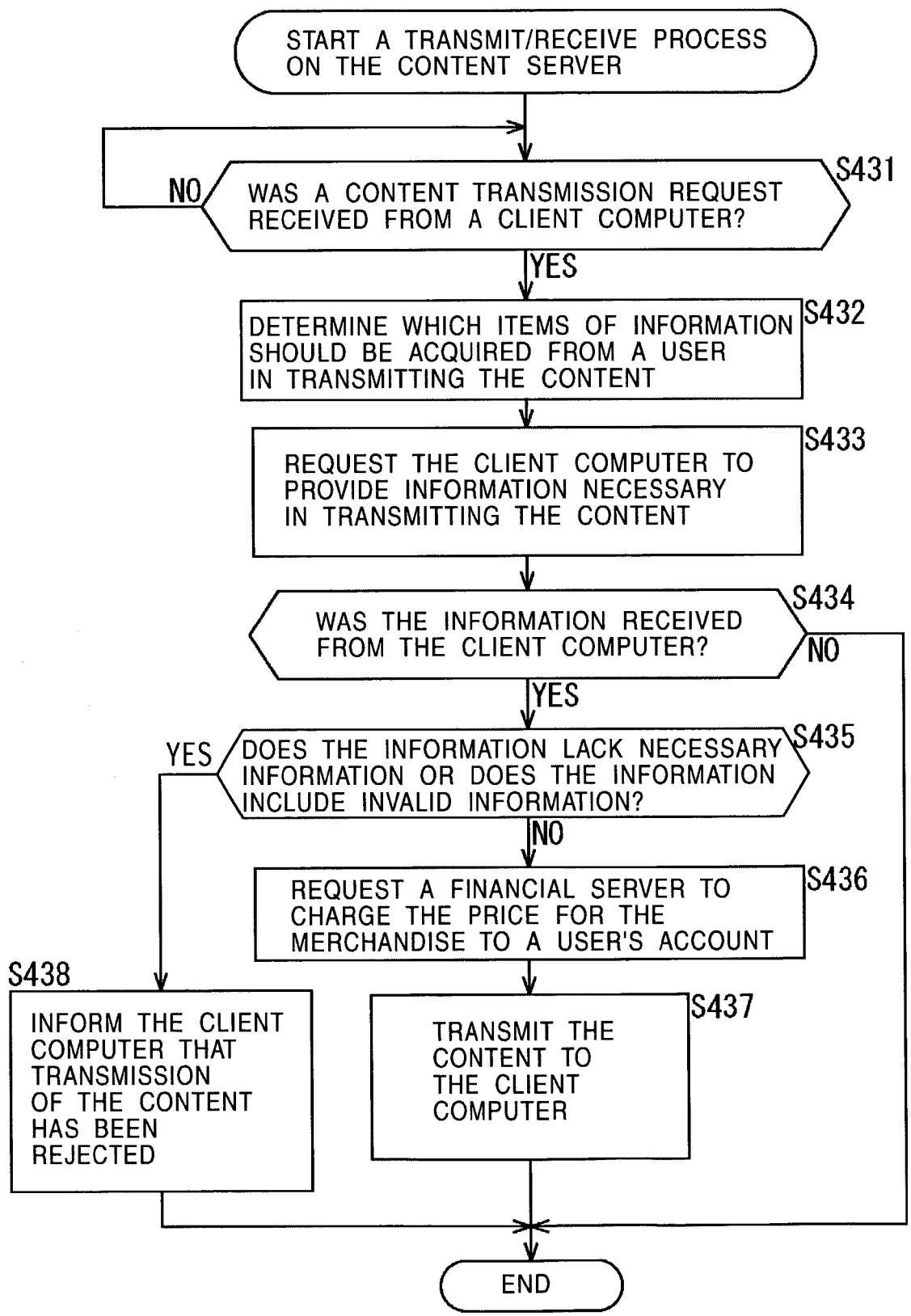
FIG. 40 is a flow chart showing a content transmit/receive process performed by a content server.

The flow charts shown in FIG. 38 and FIG. 39 represent a process performed by the client computer 6, and the flow chart shown in FIG. 40. represent a process performed by the content server 21. In the following description, the process of the client computer 6 is performed by the CPU 201 by executing various programs. The processes of the content server 21 is performed by the CPU 121 by executing various programs.

Herein, it is assumed that a virtual shop is already displayed on the display 208 of the client computer 6 and icons corresponding to music contents (hereinafter, referred to simply as content icons) are also already displayed at particular locations in the virtual shop. In this situation, the input monitor program 241 of the client computer 6 monitors the operation unit 206 to detect an operation performed on the operation unit 206. If an operation performed on the operation unit 206 is detected, the input monitor program 241 supplies operation information indicating the performed operation to the world management program 242.

In step S401 in FIG. 38, on the basis of operation information provided by the input monitor program 241, the world management program 242 determines whether an operation of selecting a content icon is performed on operation unit 206. If an operation of selecting a content icon performed on operation unit 206 is not detected, step S401 is performed repeatedly until an operation is detected.

That is, the world management program 242 performs step S401 repeatedly until an operation of selecting a content icon is performed on the operation unit 206. If the world management program 242 determines that an operation of selecting a content icon has been performed on the operation unit 206, the process proceeds to step S402.

In step S402, the world management program 242 commands the communication program 245 to request the content server 21 to transmit a music content corresponding to the selected content icon. In response, the communication program 245 requests the content server 21 to transmit the music content corresponding to the selected content icon. In the above process, the request is transmitted from the communication unit 210 of the client computer 6 to the content server 21 via the network 1.

The request transmitted to the content server 21 includes a title code of a music content corresponding to the selected content icon. In a later process, when the content server 21 receives this request, the content server 21 identifies the requested music content by this title code.

The CPU 121 of the content server 21 waits in step S431 in FIG. 40 until the music content transmission request is requested from the client computer 6. If the music content transmission request from the client computer 6 is received via the communication unit 130, the process proceeds to step S432.

In step S432, the CPU 121 of the content server 21 reads the title code included in the received music content transmission request. The CPU 121 then searches the content database 161 shown in FIG. 37 for a title code identical to the title code included in the received music content transmission request. The CPU 121 then reads, from the content database 161 shown in FIG. 37, items of user information (for example, name, credit card number, and mail address) which are needed to transmit a content corresponding to the detected title code and thus which are needed to be acquired from the user. Thereafter, the process proceeds to step S433.

In step S433, the CPU 121 transmits, to the client computer 6 via the communication unit 130, a request for personal information of the items (for example, name, credit card number, and mail address) read in step S432.

In step S403 in FIG. 38, the communication program 245 of the client computer 6 receives the request for information (for example, name, credit card number, and mail address) transmitted in step S433 from the content server 21. In step S404, the world management program 242 retrieves the requested information from the user information database 261 shown in FIG. 16 and detects the importance levels of the respective items of the requested information. The database shown in FIG. 16 has already been described in detail, and thus no further description is given herein.

For example, in a case in which the items of information requested are the name, the credit card number, and the mail address of the user, the world management program 242 searches the user information database 261 shown in FIG. 16 and detects the importance level of the name as 1, the credit card number as 5, and the mail address as 1.

In step S405, the world management program 242 detects a highest importance level of those detected in step S404. For example, in a case in which the items of information requested are the name, the credit card number, and the mail address of the user, the world management program 242 compares the importance levels, that is, 1 assigned to the name, 5 assigned to the credit card number, and 1 assigned to the mail address, with each other, and determines that the highest importance level is 5 assigned to the credit card number. Thereafter, the world management program 242 commands the communication program 245 examines the object database 262 shown in FIGS. 17 and 18 to detect an object corresponding to the detected highest importance level. The database shown in FIGS. 17 and 18 has already been described in detail, and thus no further description is given herein.

For example, in a case in which the detected highest importance level is 5, the world management program 242 detects an object corresponding to 5 in importance level, that is, detects a bag labeled "secret" assigned an importance level of 5 in FIG. 17.

After determining the object corresponding to the highest importance level of the information, the process proceeds to step S406.

In step S406, the world management program 242 command the display program 243 to display a screen for prompting the user to select whether or not to permit transmission of the information. In response, the display program 243 displays the screen for prompting the user to select whether or not to permit transmission of the information, as shown in FIGS. 19 and 20. However, in this step S406, the message 451 displayed in the screen shown in FIG. 19 is not "You want to purchase a cap, don't you? We need your name, address, and credit card number." but "You want title A, don't you? We need your name, credit card number, and mail address". Furthermore, the message 473 displayed in the screen shown in FIG. 20 is not Do you agree to give information about your name, address, and credit card number? Yes/No but "Do you agree to give information about your name, credit card number, and mail address? Yes/No". The other parts are displayed in a similar manner as described earlier.

As for the object 472 displayed in the screen shown in FIG. 20, the object determined in step S405 is displayed. The object 472 is displayed at a location close to the information providing agent 471.

If the user clicks "Yes" in the message 473 with the mouse (operation unit 206), transmission of the personal information is permitted. Conversely, if the user clicks "No" in the message 473 with the mouse (operation unit 206), transmission of the personal information is rejected.

After the screen shown in FIG. 20 is displayed on the display 208 by the display program 243, the process proceeds to step S407. In step S407, on the basis of operation information provided by the input monitor program 241, the world management program 242 determines whether "Yes" in the message 473 has been clicked. If it is determined that "Yes" is not clicked, that is, if it is determined that "No" has been clicked, the process proceeds to step S408.

In step S408, the world management program 242 commands the display program 243 to delete the information providing agent 471 the object 472, and the message 473 shown in FIG. 20 from the image displayed on the display 208 and then display the original virtual shop and content icons. In response, the display program 243 deletes the information providing agent 471 the object 472, and the message 473 from the image displayed on the display 208 and displays the original virtual shop and content icons. Thereafter, the process proceeds to step S409.

In step S409, the world management program 242 commands the communication program 245 to transmit to the content server 21 a message indicating that transmission of the personal information is rejected. In response, the communication program 245 transmits to the content server 21 the message indicating that transmission of the personal information is rejected. Thereafter, the process returns to step S401, and step S401 and following steps are repeated.

If the CPU 121 of the content server 21 receives via the communication unit 130 the message transmitted in step S409 from the client computer 6 to inform that transmission of the personal information is rejected, then, in step S434 in FIG. 40, the CPU 121 determines that the personal information is not received from the client computer 6, and the CPU 121 ends the content transmission process.

In step S407, if the world management program 242 determines that "Yes" in the message 473 is clicked, the process proceeds to step S410 in FIG. 39.

In step S410, the world management program 242 commands the display program 243 to move the object 472 from the location close to the information providing agent 471 to a location close to the shop agent 406, as shown in FIG. 21. The screen shown in FIG. 21 has already been described in detail, and thus no further description is given herein.

In step S411, on the basis of operation information provided by the input monitor program, the world management program 242 determines whether the object 472 moving from the information providing agent 471 to the shop agent 406 is clicked with the mouse (operation unit 206). If it is clicked with the mouse (operation unit 206), the process proceeds to step S412.

More specifically, as shown in FIG. 26, if a cursor of the mouse 531 is put on the object 472 moving from the information providing agent 471 to the shop agent 406, and if the mouse is clicked, the process proceeds to step S412. Note that the arrow shown in FIG. 26 to indicate the movement of the object 472 is not actually displayed.

In step S412, the world management program 242 commands the display program 243 to display a screen, such as that shown in FIG. 27, on the display 208. The screen shown in FIG. 27 has already been described in detail, and thus no further description is given herein.

After completion of step S412, the process return to step S406 shown in FIG. 38, and step S406 and following steps are repeated.

On the other hand, in the case in which the world management program 242 determines, in step S411, that the object 472 moving from the information providing agent 471 to the shop agent 406 is not clicked with the mouse (operation unit 206), the process proceeds to step S413.

In step S413, the world management program 242 determines whether the moving of the object 472 from the information providing agent 471 to the shop agent 406 is completed. If the movement of the object 472 from the information providing agent 471 to the shop agent 406 is not completed yet, the process returns to step S411, and step S411 and following steps are repeated.

If, in step S413, the world management program 242 determines that the movement of the object 472 from the information providing agent 471 to the shop agent 406 is completed, the world management program 242 commands the display program 243 to display a screen such as that shown in FIG. 22 on the display 208. The screen shown in FIG. 22 has already been described in detail, and thus no further description is given herein. Thereafter, the process proceeds to step S414.

In step S414, the world management program 242 commands the communication program 245 to transmit information (indicating, for example, the name, the credit card number, and the mail address, of the user) necessary to purchase the merchandise to the content server 21. In response, the communication program 245 transmits the information (indicating, for example, the name, the credit card number, and the mail address, of the user) necessary to purchase the merchandise to the content server 21. In the above process, the information is transmitted from the communication unit 210 of the client computer 6 to the content server 21 via the network 1.

In the case in which the items of information necessary to purchase the merchandise are the name, the credit card number, and the mail address of the user, the name "Daisuke Suzuki", the credit card number "0123456789", and the mail address "suzuki@xxx.co.jp", shown in FIG. 16, are transmitted from the client computer 6 to the content server 21.

If the CPU 121 of the content server 21 receives via the communication unit 130 the personal information transmitted in step S414 from the client computer 6, then, in step S434 in FIG. 40, the CPU 121 determines that the private information has been received from the client computer 6, and thus the process proceeds to step S435.

In step S435, the CPU 121 of the content server 21 determines whether or not the received personal information includes all necessary items and whether or not the received personal information includes invalid information. That is, the CPU 121 of the content server 21 first determines whether or not the received personal information includes all items necessary to transmit the content. For example, in the case in which the items of information necessary to transmit the content are the name, the credit card number, and the mail address of the user, the CPU 121 of the content server 21 determines whether the name, the credit card number, and the mail address of the user have all been received.

Secondary, the CPU 121 of the content server 21 determines whether all items of the received private information are valid. For example, it is determined whether the address of the user is a true address and the credit card number is a correct number. If the CPU 121 of the content server 21 determines that all necessary items of private information have been received and that all items of the received private information are valid, the process proceeds to step S436.

In step S436, the CPU 121 of the content server 21 transmits to the financial server 5 a request for transfer of money corresponding to the price of the merchandise from an account of the user to an account of the content provider 3. The request includes the credit card number of the user.

The financial server 5 performs a process in a similar manner as described earlier with reference to the flow chart shown in FIG. 23. More specifically, the financial server 5 receives the request transmitted in step S436 from the content server 21, and, in response to the received request, transfers money corresponding to the price for the merchandise from an account of the user to an account of the content provider 3. This transfer process is performed on the basis of the credit card number of the user received from the content server 21.

Referring again to FIG. 40, in step S437, the CPU 121 of the content server 21 transmits the requested music content to the client computer 6 via the communication unit 130.

In step S415, after completion of step S414, the world management program 242 of the client computer 6 starts a timer set to a predetermined timeout value (1 min, for example) and monitors whether receiving of the music content from the content server 21 is started before the timeout period has elapsed. If receiving of the music content from the content server 21 is started before the timeout period has elapsed, then, in step S415, the world management program 242 determines that receiving of the music content has been started before the timeout period has elapsed, and thus the process proceeds to step S416.

In step S416, the world management program 242 describes the purchase date of the transmitted merchandise. (content), the purchase time, the content name, the content code, and the price of the merchandise in the purchase history database 263 thereby updating the purchase history database 263. Thereafter, the process proceeds to step S417.

In step S417, the world management program 242 stores, into the storage unit 210, the content being received from the content server 21. The music content stored in the storage unit 210 may be played back using playback software installed on the client computer 6. Alternatively, the music content may be played back while receiving (streaming) it.

In a case in which receiving of the music content from the content server 21 is not started within the predetermined period, then, in step S415, the world management program 242 of the client computer 6 determines that receiving of the music content is not started before the timeout period has elapsed, the process proceeds to step S418.

In step S418, the world management program 242 commands the display program 243 to display a screen, such as that shown in FIG. 24, on the display 208. In the screen displayed in step S418, an object 472 is displayed close to the shop agent 406.

In step S419, the world management program 242 commands the display program 243 to move the object 472 being displayed, from the location close to the shop agent 406 to a location close to the information providing agent 471, as shown in FIG. 24. The screen shown in FIG. 24 has already been described in detail, and thus no further description is given herein. After completion of moving the object 472 to the information providing agent 471, the process proceeds to step S420.

In step S420, the world management program 242 commands the display program 243 to display a screen, such as that shown in FIG. 25, on the display 208. The screen shown in FIG. 25 has already been described in detail, and thus no further description is given herein. However, in this step S420, the message 511 "Procedure of purchasing the cap has failed. For further detailed information, click here" displayed in the screen shown in FIG. 25 is replaced with a message Transmission of the requested title A has failed. For further detailed information, click here. From this message 511, the user can know that transmission of the music content has failed.

Also in the case in which the CPU 121 of the content server 21 determines, in step S435 in the flow chart shown in FIG. 40, determines that necessary information is not included in the received private information or that the received private information includes invalid information, steps S418 to S410 described above are performed on the client computer 6.

In step S435 in the flow chart shown in FIG. 40, if the CPU 121 of the content server 21 determines that necessary information is not included in the received private information or that the received private information includes invalid information, the process jumps to step S438.

In step S438, the CPU 121 of the content server 21 transmits a message to the client computer 6 via the communication unit 60 to inform that transmission of the content is rejected.

If the client computer 6 receives via the communication unit 210 this message transmitted from the content server 21, then, in step S435, the world management program 242 determines that receiving of the music content from the content server 21 is not started within the predetermined period. In this case, the process jumps to step S418, and step S418 and following steps are performed.

The content transmission process has been described above. As described above, when information is transmitted from the client computer 6 to the content server 21, an image and a message are displayed on the display 208 to inform that the information is going to be transmitted. This makes it possible for the user to easily know that information is going to be transmitted. Furthermore, an object corresponding to the importance level of the information to be transmitted is displayed thereby allowing the user to intuitively recognize the importance level of the information to be transmitted.

As described in detail above with reference to steps S410, S411, S413, and S414 performed on the client computer 6, the timing of actually transmitting private information from the client computer 6 to the content server 21 (step S414) is after the completion of transferring the object 472, displayed on the display 208 of the client computer 6, from the information providing agent 471 to the shop agent 406. This causes the user to recognize that the transmission of the information is completed when step S413 is completed after steps S410 and S411. However, in reality, the information has not been transmitted yet at that point of time.

That is, because the actual transmission timing is set such that the information is transmitted after the completion of the process of informing the user that the information is going to be transmitted (steps S410, S411, and S413), if the user cancels the transmission of the information within a period during which the informing process is performed, the transmission is completely cancelled without transmitting even any part of the information. This makes it possible to reduce a possibility that information is undesirably transmitted.

When a user cancels transmission of information after issuing a transmission command, the cancellation is performed, in most cases, within several seconds after issuing the transmission command. Taking this fact into account, when information is transmitted, an object representative of the information is displayed for a period of time with a length of a several seconds to several ten seconds before the information is actually transmitted. When the user wants to cancel the transmission of the information, if the user clicks the object, the transmission of the information is completely cancelled without transmitting even any part of the information.

In the embodiments described above, the object displayed on the display 208 of the client computer 6 is varied depending on the importance level of the information to be transmitted, so that the user can understand how important information is going to be transmitted. That is, the user can visually recognize the importance level of the information which is going to be transmitted. Alternatively, the importance level of information which is going to be transmitted may be represented in another manner other than a visual manner.

For example, the importance level may be presented to the user via audio information. More specifically, depending on the importance level of information to be transmitted, a voice message may be output from the audio output unit 207 (for example, for information with an importance level of 1, the voice message may be "information is going to be transmitted"; the voice message may be "rather important information is going to be transmitted" for importance level 2; important information is going to be transmitted" for level 3; very important information is going to be transmitted" for level 4; and extremely important information is going to be transmitted" for level 5).

Instead of visual information or audio information, information in another form such as sense of taste, sense of smell, or sense of touch may be employed to indicate the importance level as long as it can inform the user of the importance level.

Although in the embodiments described above, the importance level is set within the range from 1 to 5, the importance level is not limited to such a range. The number of levels for importance may be set to an arbitrary value such as 2, 3, 4, . . . , and so on. In the case in which 3 levels are employed, respective levels may be represented by, for example, "important", "normal", and "not important".

When communication is performed between any two devices which are members of the group including the mail-order sales server 11, the content server 21, the Web server 4, the financial server 5, and the client computer 6, any part of the information transmitted between the two devices may be encrypted by means of a particular encryption technique to ensure that the information is securely transmitted.

Although in the embodiments described above, the mouse or the keyboard is employed as the operation unit 206 used by the user to input a command or data into the client computer 6, the operation unit 206 is not limited to the mouse or the keyboard. For example, a rotate-and-press type operation device such as a jog dial may be employed as the operation unit 206. Any other device may also be employed as the operation unit 206, as long as it can be used by a user to input a command.

In the embodiments described above, communication is performed between the client computer 6 and the mail-order sales server 11 or between the client computer 6 and the content server 21. The invention can also be employed when communication is performed between any two of devices. For example, in communication between the Web server 4 and a client computer 6, between the financial server 5 and a client computer 6, between a client computer 6 and another client computer 6, or between any two devices, the present invention can be employed when information is transmitted from one to the other.

In the embodiments described above, a general-purpose personal computer (client computer) is employed as the device used by a user. However, the device used by a user is not limited to the client computer 6. Any process performed by the client computer 6 in any embodiment described above may be performed by another device such as a portable information terminal, a portable telephone, or a PHS (Personal Handy-phone System) device. That is, any process performed by the client computer 6 in any embodiment described above may be performed by a device having an operation unit, a communication unit, and a display.

In the embodiments described above, the network 1 is assumed to be the Internet. However, the network 1 is not limited to the Internet. For example, a LAN (Local Area Network) may also be employed as the network 1.

In the present description, steps described in a program stored in a storage medium such as the ROM 52, ROM 122, or ROM 202 or the RAM 53, RAM 123, or RAM 203, may be performed either in time sequence in accordance with the order described in the program or in a parallel or separate fashion.

In the present description, the term "system" is used to represent an entire set of apparatuses.

As described above, the present invention allows a user to easily perform an operation in transmission/reception of information.

What is claimed is:

1. An information processing system comprising:
a first information processing apparatus connected to a network, and a second information processing apparatus configured to transmit information to the first information processing apparatus, wherein
the first information processing apparatus includes:

reception means for receiving the information from the second information processing apparatus, and the second information processing apparatus includes:

storage means for storing images corresponding to respective importance levels, one of the images is selected depending on an importance level of the information to be transmitted to the first information processing apparatus and is displayed;

reading means for, when the information is transmitted to the first information processing apparatus, reading from the storage means the selected one of the images corresponding to the importance level of the information to be transmitted;

display control means for controlling displaying the read image corresponding to the importance level of the information; and transmission means for transmitting the information to the first information processing apparatus.

2. The information processing system according to claim 1, wherein the second information processing apparatus further comprises:

reception means for receiving a request for the information from the first information processing apparatus, wherein if the reception means of the second information processing apparatus receives the request for the information, the reading means reads the image corresponding to the importance level of the information to be transmitted.

3. The information processing system according to claim 1, wherein the information includes at least one or more pieces of information respectively indicating a name, an address, a telephone number, a credit card number, and a mail address, of a user.

4. The information processing system according to claim 1, wherein the second information processing apparatus further comprises:

accepting means for accepting inputting of the information from a user, wherein the storage means stores the information accepted by the accepting means.

5. The information processing system according to claim 1, wherein the storage means stores importance levels respectively corresponding to the one or more pieces of information and also stores images corresponding to the respective importance levels, and the reading means reads an image corresponding to a highest importance level of the importance levels of the one or more pieces of information to be transmitted.

6. The information processing system according to claim 5, wherein the second information processing apparatus further comprises:

setting means for setting the importance levels of the one or more pieces of information, respectively, wherein the storage means stores the importance levels set by the setting means, in relation to the corresponding one or more pieces of information.

7. An information processing method comprising:

storing images corresponding to respective importance levels, at a second information processing apparatus, one of the images is selected depending on an importance level of information to be transmitted to a first information processing apparatus;

reading, when the information is transmitted to the first information processing apparatus, the selected one of the images stored at the second information processing apparatus, the read image corresponding to the importance level of the information to be transmitted;

controlling displaying the read image corresponding to the importance level of the information;

transmitting, from the second information processing apparatus, the information to the first information processing; and receiving the information by a reception means of the first processing apparatus.

8. A computer readable storage medium including computer executable instructions, which when executed by a processor, cause the processor to perform a method for controlling an information processing apparatus, said method comprising:

storing images corresponding to respective importance levels, at a second information processing apparatus, one of the images is selected depending on an importance level of information to be transmitted to a first information processing apparatus;

reading, when the information is transmitted to the first information processing apparatus, the selected one of the images stored at the second information processing apparatus, the read image corresponding to the importance level of the information to be transmitted;

controlling displaying the read image corresponding to the importance level of the information; and transmitting, from the second information processing apparatus, the information to the first information processing apparatus; and receiving the information by a reception means of the first processing apparatus.

* * * * *

UNITED STATES PATENT AND TRADEMARK OFFICE
CERTIFICATE OF CORRECTION

PATENT NO. : 7,366,753 B2  Page 1 of 1
APPLICATION NO. : 10/430190
DATED : April 29, 2008
INVENTOR(S) : Takahiro Miyake It is certified that error appears in the above-identified patent and that said Letters Patent is hereby corrected as shown below:

Column 34, line 23, insert -- apparatus -- before the semi-colon

Signed and Sealed this

Eighteenth Day of November, 2008

JON W. DUDAS
*Director of the United States Patent and Trademark Office*